US012191723B2

(12) United States Patent
Miyama et al.

(10) Patent No.: US 12,191,723 B2
(45) Date of Patent: Jan. 7, 2025

(54) ROTARY ELECTRIC MACHINE HAVING A STATOR CORE FORMED WITH STACKED THIN SHEETS AND AIRCRAFT USING THE ROTARY ELECTRIC MACHINE CORE

(71) Applicant: Mitsubishi Electric Corporation, Tokyo (JP)

(72) Inventors: Yoshihiro Miyama, Tokyo (JP); Hiroshi Mitsuda, Tokyo (JP); Kazumasa Ito, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 219 days.

(21) Appl. No.: 17/917,257

(22) PCT Filed: Jan. 21, 2021

(86) PCT No.: PCT/JP2021/002030
§ 371 (c)(1),
(2) Date: Oct. 6, 2022

(87) PCT Pub. No.: WO2021/240871
PCT Pub. Date: Dec. 2, 2021

(65) Prior Publication Data
US 2023/0163669 A1    May 25, 2023

(30) Foreign Application Priority Data

May 29, 2020  (JP) .................................. 2020-094052

(51) Int. Cl.
*H02K 1/18* (2006.01)
*B64D 27/24* (2024.01)
*H02K 16/02* (2006.01)

(52) U.S. Cl.
CPC ............. *H02K 16/02* (2013.01); *B64D 27/24* (2013.01); *H02K 1/18* (2013.01)

(58) Field of Classification Search
CPC .......... H02K 16/02; H02K 16/00; H02K 1/08; H02K 1/14; H02K 1/18; H02K 1/182;
(Continued)

(56) References Cited

U.S. PATENT DOCUMENTS

| | | | | | |
|---|---|---|---|---|---|
| 5,396,140 | A | * | 3/1995 | Goldie | H02K 41/025 310/216.062 |
| 2023/0163670 | A1 | * | 5/2023 | Miyama | H02K 1/22 310/216.001 |

FOREIGN PATENT DOCUMENTS

| | | | | |
|---|---|---|---|---|
| EP | 3672025 A1 | * | 6/2020 | ............. H02K 1/185 |
| JP | 2006174637 A | * | 6/2006 | |

(Continued)

OTHER PUBLICATIONS

Machine translation of JP-2006174637-A. (Year: 2006).*

(Continued)

*Primary Examiner* — Michael Andrews
(74) *Attorney, Agent, or Firm* — XSENSUS LLP

(57) ABSTRACT

This rotary electric machine includes two movable parts which are placed with a stator core interposed therebetween and rotate about an identical rotary shaft. At least part of the stator core is formed by stacking thin sheets in a rotation direction of the two movable parts. The stator core has, at both ends, stator core retention portions extended in a direction parallel to surfaces thereof opposed to the two movable parts and perpendicular to the rotation direction of the movable parts. Retention surfaces of the stator core retention portions at both ends are respectively fixed by retention members. The retention surfaces of the stator core retention portions at both ends are formed to face toward each other.

18 Claims, 20 Drawing Sheets

(58) Field of Classification Search
CPC .... H02K 1/185; H02K 1/187; H02K 2201/15;
B64D 27/24; B64D 27/30; B64D 27/34
USPC ........................................................ 310/114
See application file for complete search history.

(56) References Cited

FOREIGN PATENT DOCUMENTS

| | | | |
|---|---|---|---|
| JP | 2018-85886 A | | 5/2018 |
| JP | 2018085886 A | * | 5/2018 |
| JP | 2019-37084 A | | 3/2019 |

OTHER PUBLICATIONS

Machine translation of JP-2018085886-A. (Year: 2018).*
International Search Report and Written Opinion mailed on Mar. 30, 2021, received for PCT Application PCT/JP2021/002030, filed on Jan. 21, 2021, 9 pages including English Translation.

* cited by examiner

ROTARY ELECTRIC MACHINE HAVING A STATOR CORE FORMED WITH STACKED THIN SHEETS AND AIRCRAFT USING THE ROTARY ELECTRIC MACHINE CORE

The present application is based on PCT filing PCT/JP2021/002030, filed Jan. 21, 2021, which claims priority to JP 2020-094052, filed May 29, 2020, the entire contents of each are incorporated herein by reference. This application is also related to U.S. patent application Ser. No. 17/917,261 entitled ELECTROMAGNETIC DEVICE AND AIRCRAFT IN WHICH ELECTROMAGNETIC DEVICE IS USED, filed Oct. 6, 2022. The entire contents of each are incorporated herein by reference.

TECHNICAL FIELD

The present disclosure relates to a rotary electric machine and an aircraft using the rotary electric machine.

BACKGROUND ART

Conventionally, regarding a stator core surrounded by two opposed movable parts in a rotary electric machine, it is disclosed that the stator core is formed by stacking thin sheets in a direction parallel to two surfaces facing the movable parts which are rotors and perpendicular to the movable direction of the movable parts, and retention members are fitted to holes provided so as to penetrate in the stacking direction, thereby retaining the stator core (for example, Patent Document 1).

Also, it is disclosed that a stator core, in a rotary electric machine, is formed by stacking thin sheets in a direction parallel to the two opposed movable parts and substantially parallel to the movable direction of the movable parts, bolt holes for retaining the stacked sheets are provided in a direction parallel to two surfaces of the stator core facing the movable parts which are rotors and perpendicular to the movable direction of the movable parts, and bolts are fastened, thereby retaining the stator core (for example, Patent Document 2).

CITATION LIST

Patent Document

Patent Document 1: Japanese Laid-Open Patent Publication No. 2019-37084
Patent Document 1: Japanese Laid-Open Patent Publication No. 2018-85886

SUMMARY OF THE INVENTION

Problems to be Solved by the Invention

In Patent Document 1, an electromagnetic force due to operation of the rotary electric machine acts in a direction to cause shear between the stacked sheets of the stator core, and therefore the retention members are fitted to the holes penetrating in the stacking direction, so as to retain the stator core. Thus, the retention members interfere with a magnetic path of the stator core, leading to size increase of the device and reduction in efficiency.

On the other hand, in Patent Document 2, since the stator core needs to be retained by applying a clamping force in the stacking direction, the magnetic property of the stator core is deteriorated. In addition, also in another example in Patent Document 2, the stator core is pressed by fitting portions and thus the magnetic property is deteriorated.

The present disclosure has been made to solve the above problem, and an object of the present disclosure is to provide a rotary electric machine in which a stator core is retained without increasing the size of the device and without deteriorating the magnetic property, and an aircraft using the rotary electric machine.

Solution to the Problems

A rotary electric machine according to the present disclosure includes: a stator core; and two movable parts which are placed with the stator core interposed therebetween and rotate about an identical rotary shaft. At least part of the stator core is formed by stacking thin sheets in a rotation direction of the two movable parts. The stator core has, at both ends, stator core retention portions extended in a direction parallel to surfaces thereof opposed to the two movable parts and perpendicular to the rotation direction of the movable parts. Retention surfaces of the stator core retention portions at both ends are respectively fixed in contact with retention members. The retention surfaces of the stator core retention portions at both ends are formed to face toward each other.

Effect of the Invention

In the rotary electric machine according to the present disclosure, since the stator core is retained with tensile stress applied thereto, it becomes possible to retain the stator core without increasing the size of the device and without deteriorating the magnetic property of the stator core.

DESCRIPTION OF EMBODIMENTS

Figure 1:
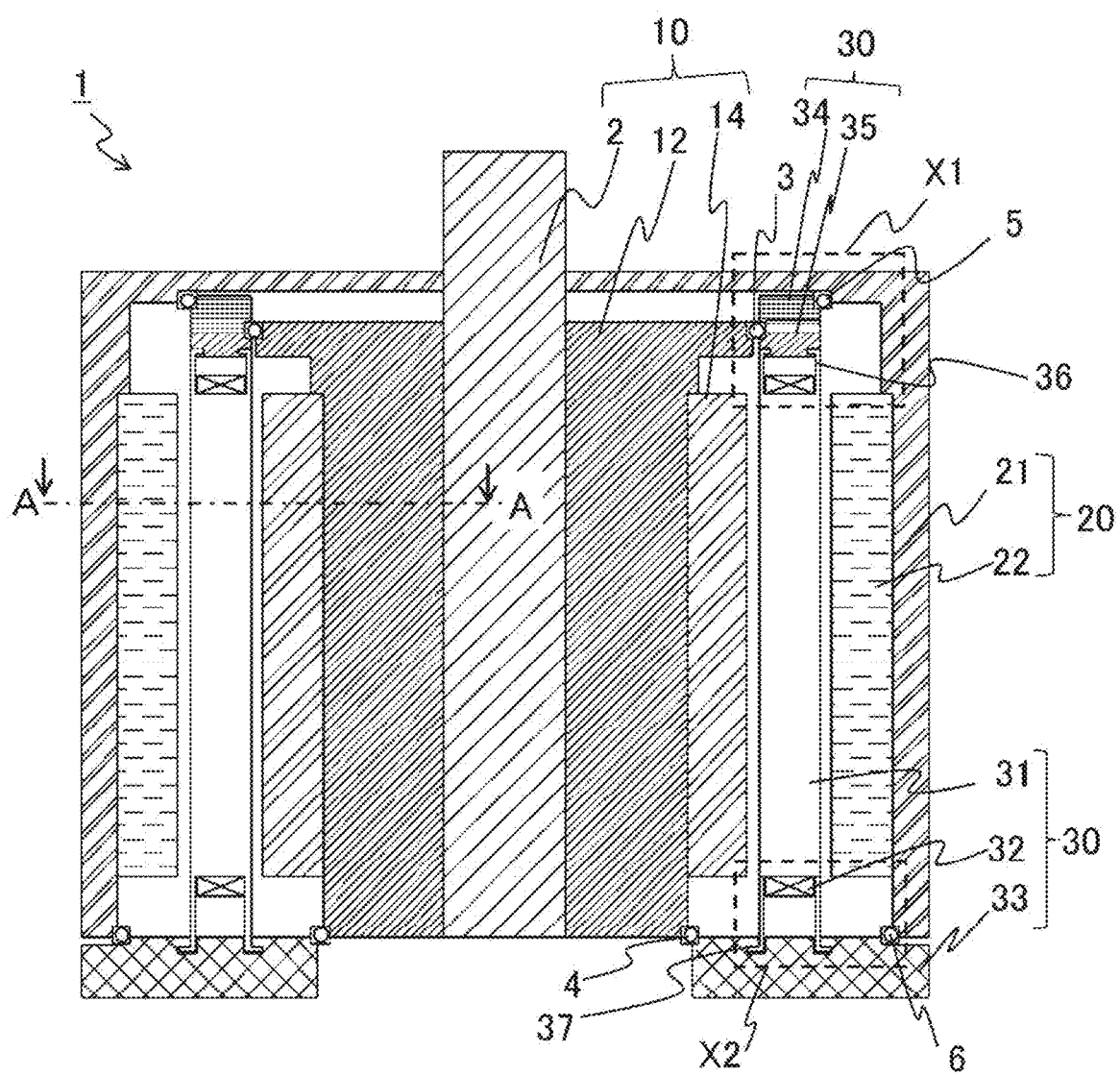
FIG. 1 is a sectional view along a rotary shaft of a rotary electric machine according to embodiment 1.

Hereinafter, embodiments will be described with reference to the drawings. The drawings are schematically shown and some configurations are omitted or simplified for convenience of description. The relationship of sizes and positions of components and the like shown in different drawings are not necessarily precisely shown, and may be changed as appropriate. In the following description, the same constituent elements are denoted and shown by the same reference characters, and also they are the same in names and functions. Therefore, the detailed description thereof may be omitted for avoiding redundant description.

Embodiment 1

Hereinafter, a rotary electric machine according to embodiment 1 will be described with reference to the drawings.

FIG. 1 is a sectional view along a rotary shaft, showing the structure of the rotary electric machine according to embodiment 1. In FIG. 1, a rotary electric machine 1 includes two rotors which are an inner rotor 10 and an outer rotor 20, and a stator 30 provided between the two rotors in the radial direction, and is formed as a radial gap motor of a double-rotor type.

The inner rotor 10 includes a shaft 2, a boss 12 press-fitted and fixed to the shaft 2, and a permanent magnet 14 adhered and fixed to the radially outer side of the boss 12.

The outer rotor 20 includes an outer shaft 21 fixed to the shaft 2, and a permanent magnet 22 adhered and fixed to the radially inner side of the outer shaft 21.

In the stator 30, a stator core 31 is provided in the axial direction between a load-side base retention member 35 attached to a load-side stator base 34, and a non-load-side stator base 33, and a stator coil 32 is wound around the stator core 31. The stator 30, which is provided between the inner rotor 10 and the outer rotor 20, rotatably retains the inner rotor 10 and the outer rotor 20 by a load-side inner bearing 3, a load-side outer bearing 5, a non-load-side inner bearing 4, and a non-load-side outer bearing 6.

At both ends in the axial direction, both side portions of the stator core 31 on the inner rotor 10 side and the outer rotor 20 side extend and protrude in the axial direction. Stator core load-side retention portions 36 which are distal end portions of the stator core 31 on the load side are bent inward in L shapes, and stator core non-load-side retention portions 37 which are distal end portions of the stator core 31 on the non-load side are bent outward in L shapes. The stator core 31 is formed of a steel sheet, and the stator core load-side retention portions 36 and the stator core non-load-side retention portions 37 are parts of the stator core 31 and are formed of the same steel sheet. That is, the stator core 31 is formed by stacking thin sheets in the rotation direction of the inner rotor 10 and the outer rotor 20, and has, at both ends, stator core retention portions extended in a direction parallel to the surfaces opposed to the inner rotor 10 and the outer rotor 20 and perpendicular to the rotation direction.

Figure 2:
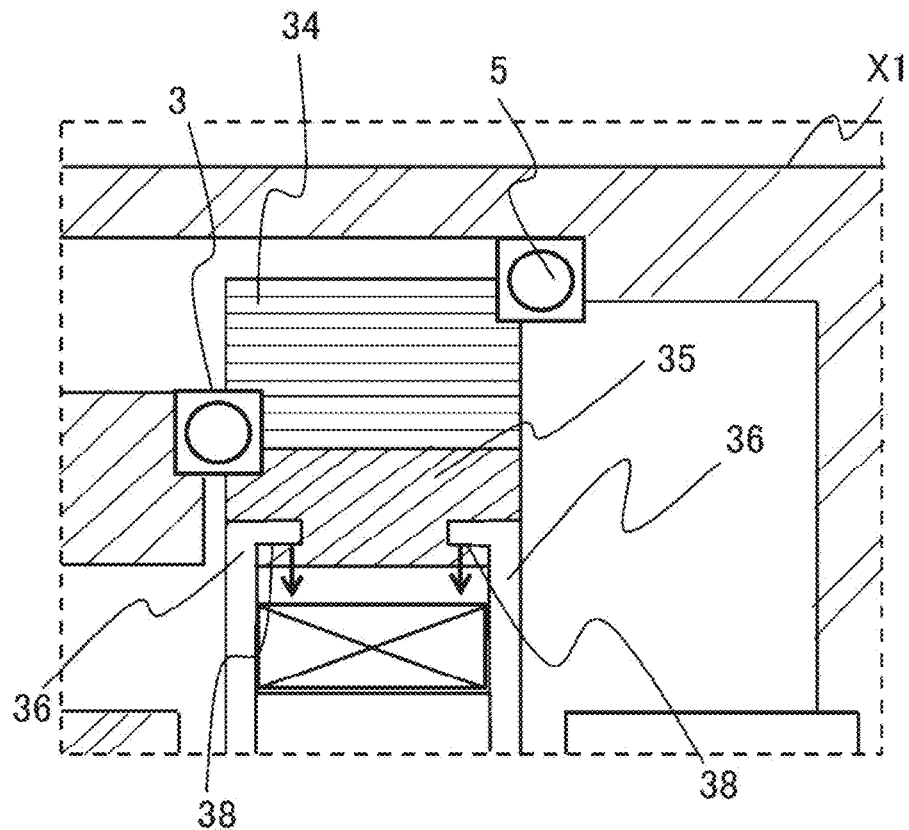
FIG. 2 is a sectional view along the rotary shaft of the rotary electric machine according to embodiment 1 and is a partial enlarged view of FIG. 1.
Figure 3:
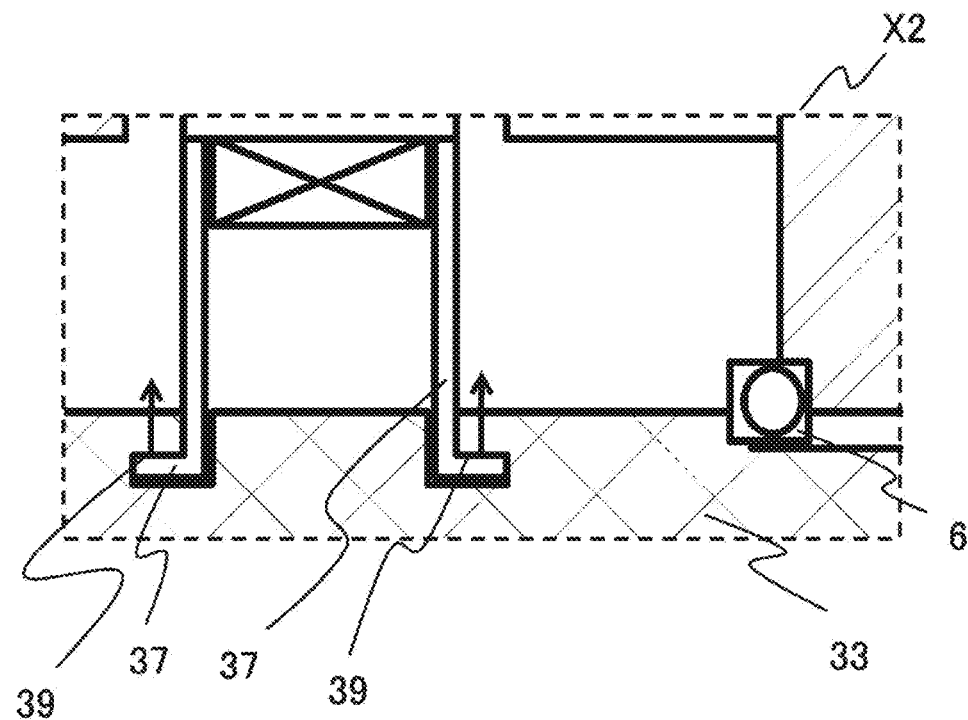
FIG. 3 is a sectional view along the rotary shaft of the rotary electric machine according to embodiment 1 and is a partial enlarged view of FIG. 1.

FIG. 2 is an enlarged view in an area X1 enclosed by a broken line in FIG. 1, and FIG. 3 is an enlarged view in an area X2 enclosed by a broken line in FIG. 1. FIG. 2 and FIG. 3 show structures at both ends in the axial direction of the stator core 31.

In FIG. 2, the stator core load-side retention portions 36 which are the distal end portions extended toward the load side which is one side in the axial direction of the stator core 31, are bent in L shapes so as to be within the axial-direction range of the stator core 31, and are inserted in grooves in the load-side base retention member 35. At this time, load-side retention surfaces 38 of the stator core load-side retention portions 36 are fixed in contact with the grooves in the load-side base retention member 35 provided to the load-side stator base 34.

In FIG. 3, the stator core non-load-side retention portions 37 which are the distal end portions extended toward the non-load side which is the other side in the axial direction are respectively bent in L shapes such that the extended distal end portion on the inner rotor 10 side is bent toward the inner rotor 10 side from the axial direction of the stator core 31 and the extended distal end portion on the outer rotor 20 side is bent toward the outer rotor 20 side, and are inserted in the grooves in the non-load-side stator base 33. At this time, non-load-side retention surfaces 39 of the stator core non-load-side retention portions 37 are fixed in contact with the grooves in the non-load-side stator base 33.

In the stator core 31, the direction in which the load-side retention surface 38 contacts with the load-side base retention member 35 and the direction in which the non-load-side retention surface 39 contacts with the non-load-side stator base 33 are opposed to each other in the axial direction as indicated by arrows in FIG. 2 and FIG. 3.

Although not shown, the grooves in the load-side base retention member 35 attached to the load-side stator base 34 and the grooves in the non-load-side stator base 33 have, at some parts in the circumferential direction, openings having sizes enough to allow insertion of the stator core load-side retention portions 36 and the stator core non-load-side retention portions 37. After the stator core load-side retention portions 36 and the stator core non-load-side retention portions 37 are inserted into the openings, rotation is performed in the circumferential direction to predetermined positions so that the stator core load-side retention portions 36 and the stator core non-load-side retention portions 37 are fixed so as not to come off in the axial direction.

Figure 4:
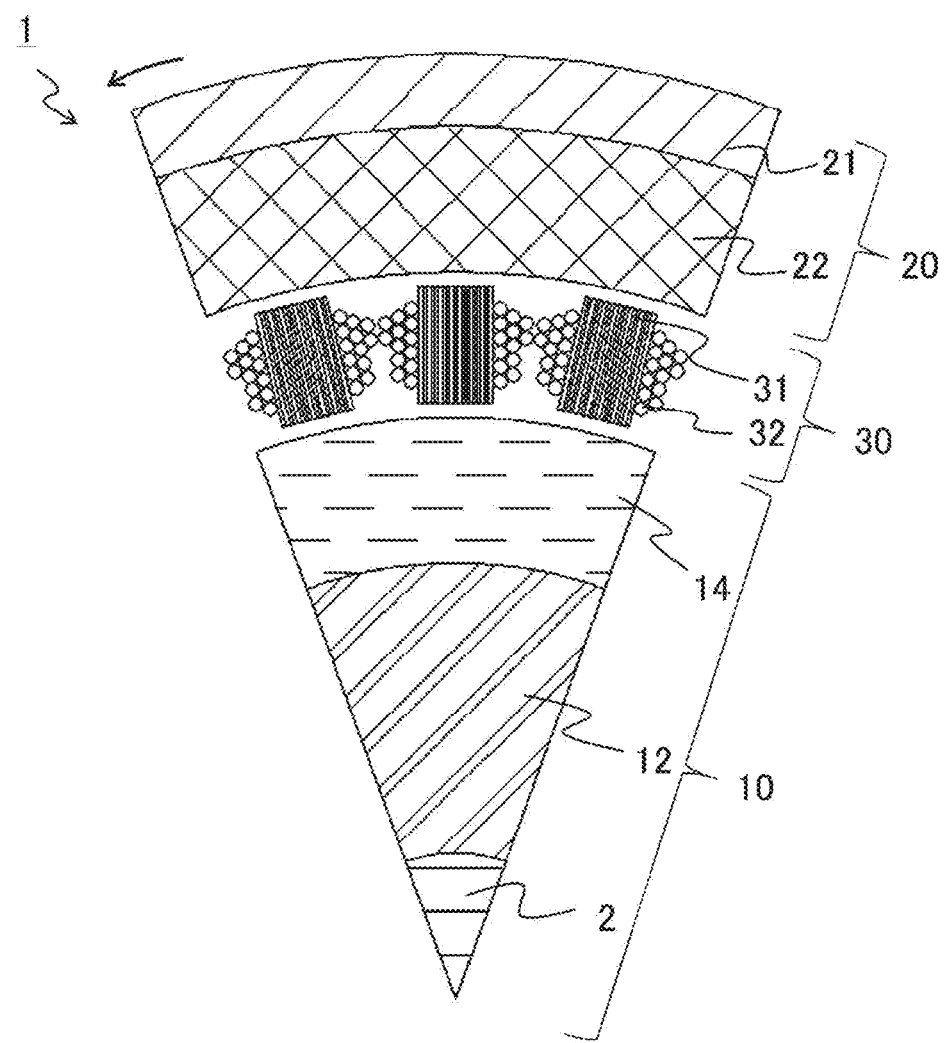
FIG. 4 is a partial sectional view along a direction perpendicular to the rotary shaft of the rotary electric machine according to embodiment 1.

FIG. 4 is a sectional view along a direction perpendicular to the rotary shaft of the rotary electric machine 1 and is a partial sectional view along an A-A line direction in FIG. 1. In the drawing, the rotary electric machine 1 has a concentrated-winding configuration with 48 poles and 72 slots. The stator core 31 is formed by stacking, substantially in the circumferential direction, thin steel sheets that are long in the axial direction. The steel sheets forming the stator core 31 are electromagnetic steel sheets manufactured by rolling, and are arranged such that the rolling direction coincides with the radial direction of the stator core.

The inner rotor 10 and the outer rotor 20 rotate at the same angular velocity counterclockwise in the drawing. That is, the inner rotor 10 and the outer rotor 20 are movable parts.

The load-side inner bearing 3 and the non-load-side inner bearing 4 shown in FIG. 1 are angular bearings. Considering the axial-direction dimension of the stator core 31, the load-side inner bearing 3 and the non-load-side inner bearing 4 are preloaded, and also, the load-side retention surfaces 38 of the stator core load-side retention portions 36 are pressed to the load-side stator base 34 (load-side base retention member 35) and the non-load-side retention surfaces 39 of the stator core non-load-side retention portions 37 are pressed to the non-load-side stator base 33.

As described above, in the rotary electric machine of embodiment 1, since the stator core 31 is fixed with tensile stress applied thereto in the axial direction by the load-side retention surfaces 38 and the non-load-side retention surface 39, magnetic property deterioration due to compressive stress does not occur and efficiency can be enhanced. In addition, end portions of the stator core 31 on the inner rotor 10 side and the outer rotor 20 side are flanges of a stator tooth and are parts where the stator coil 32 cannot be wound, and these parts are used as retention portions extended in the axial direction so as to be fixed.

Thus, it is possible to fix the stator 30 without reducing the winding space and without obstructing a magnetic path.

The stator core load-side retention portions 36 which are the distal end portions extended toward the load side which is one side in the axial direction are bent in L shapes so as to be within the axial-direction width of the stator core 31. Thus, the stator core 31 can be retained in a limited storage space.

The stator core non-load-side retention portions 37 which are the distal end portions extended toward the non-load side which is the other side in the axial direction are bent in L shapes so as to bend toward the inner rotor 10 side and the outer rotor 20 side from the axial direction of the stator core 31. Thus, the stator core non-load-side retention portions 37 can be largely provided and the retention strength can be enhanced.

In the present embodiment, the directions in which the stator core load-side retention portion 36 and the stator core non-load-side retention portion 37 are bent in L shapes are different from each other in the radial direction, so that they are less likely to come off in the radial direction. However, they may be bent in the same direction.

Embodiment 2

Hereinafter, a rotary electric machine according to embodiment 2 will be described with reference to the drawings.

Figure 5:
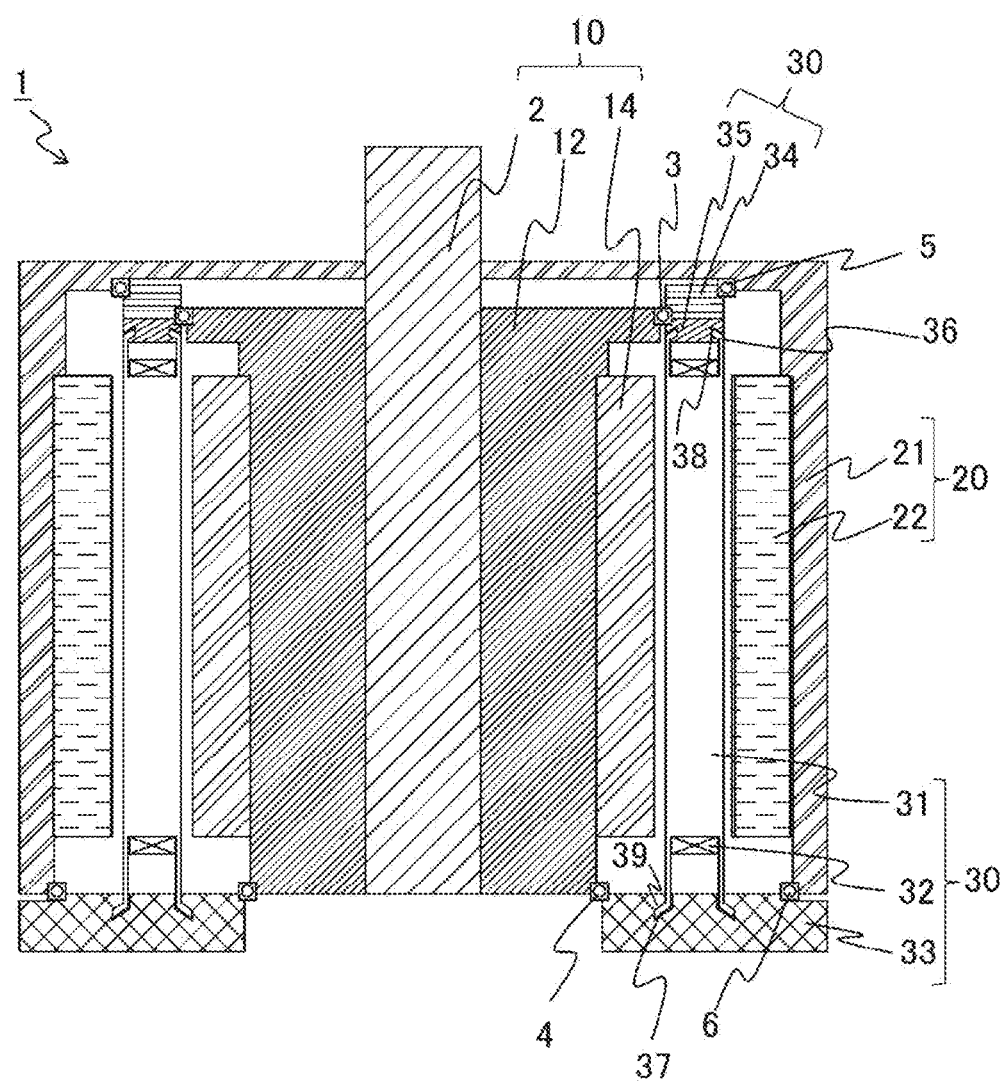
FIG. 5 is a sectional view along a rotary shaft of a rotary electric machine according to embodiment 2.

FIG. 5 is a sectional view along the rotary shaft of the rotary electric machine 1 according to embodiment 2. In FIG. 5, at both ends in the axial direction, both side portions of the stator core 31 on the inner rotor 10 side and the outer rotor 20 side extend and protrude in the axial direction from a body portion. Difference from embodiment 1 is that the stator core load-side retention portions 36 which are the distal end portions on the load side are bent inward in L shapes at obtuse angles, and the stator core non-load-side retention portions 37 which are the distal end portions on the fixed side are bent outward in L shapes at obtuse angles. That is, the angles of the L shapes are different. The stator core 31 is formed of a steel sheet, and the stator core load-side retention portions 36 and the stator core non-load-side retention portions 37 are parts of the stator core 31 and are formed of the same steel sheet.

As in embodiment 1, the stator core load-side retention portions 36 which are the distal end portions extended toward the load side which is one side in the axial direction are inserted in grooves in the load-side base retention member 35 attached to the load-side stator base 34. At this time, the load-side retention surfaces 38 of the stator core load-side retention portions 36 are fixed in contact with the grooves in the load-side base retention member 35.

The stator core non-load-side retention portions 37 which are the distal end portions extended toward the non-load side which is the other side in the axial direction are respectively bent in L shapes such that the extended distal end portion on the inner rotor 10 side is bent toward the inner rotor 10 side from the axial direction of the stator core 31 and the extended distal end portion on the outer rotor 20 side is bent toward the outer rotor 20 side, and are inserted in the grooves in the non-load-side stator base 33. At this time, the non-load-side retention surfaces 39 of the stator core non-load-side retention portions 37 are fixed in contact with the non-load-side stator base 33.

In the stator core 31, the direction in which the load-side retention surface 38 contacts with the load-side base retention member 35 and the direction in which the non-load-side retention surface 39 contacts with the non-load-side stator base 33 are opposed to each other in the axial direction, though mutually having some components in the radial direction.

As described above, also with the configuration in embodiment 2, the same effects as in embodiment 1 are provided. In addition, since the stator core load-side retention portions 36 and the stator core non-load-side retention portions 37 have L shapes at obtuse angles, the radial-direction dimensions of the stator core load-side retention portions 36 and the stator core non-load-side retention portions 37 become small relative to the areas of the load-side retention surfaces 38 and the non-load-side retention surfaces 39. Thus, the sizes of the openings of the load-side stator base 34 and the non-load-side stator base 33 can be reduced, whereby size reduction can be achieved.

Embodiment 3

Hereinafter, a rotary electric machine according to embodiment 3 will be described with reference to the drawings.

Figure 6:
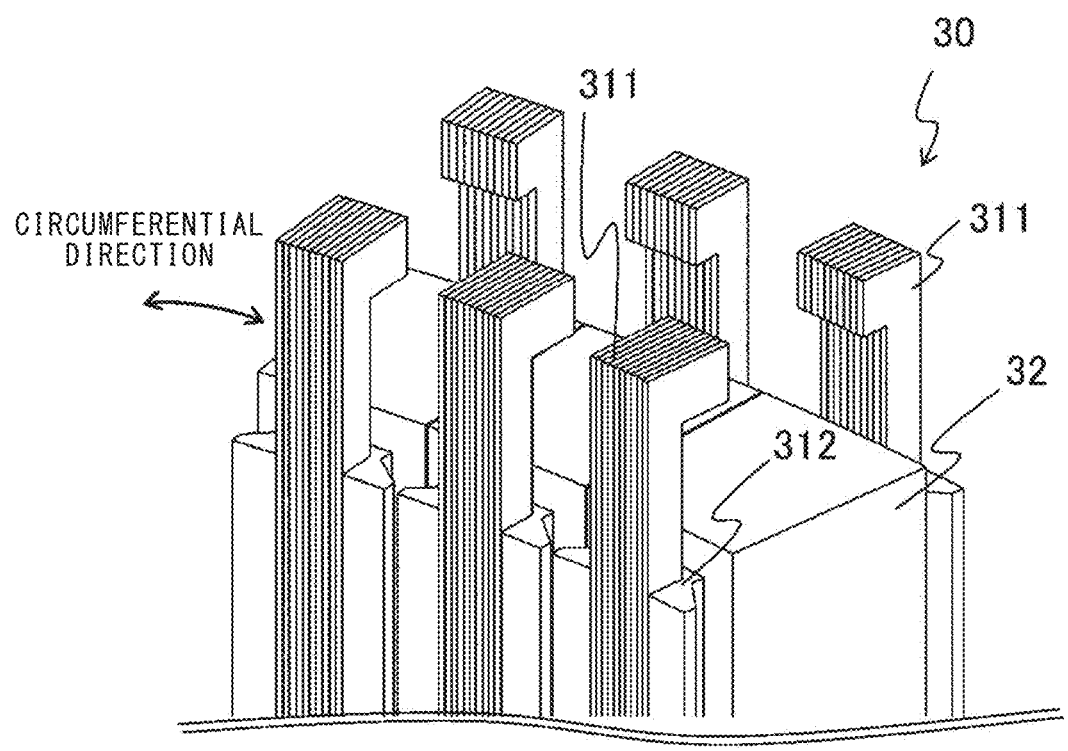
FIG. 6 is a partial perspective view showing the structure of a stator of a rotary electric machine according to embodiment 3.
Figure 7:
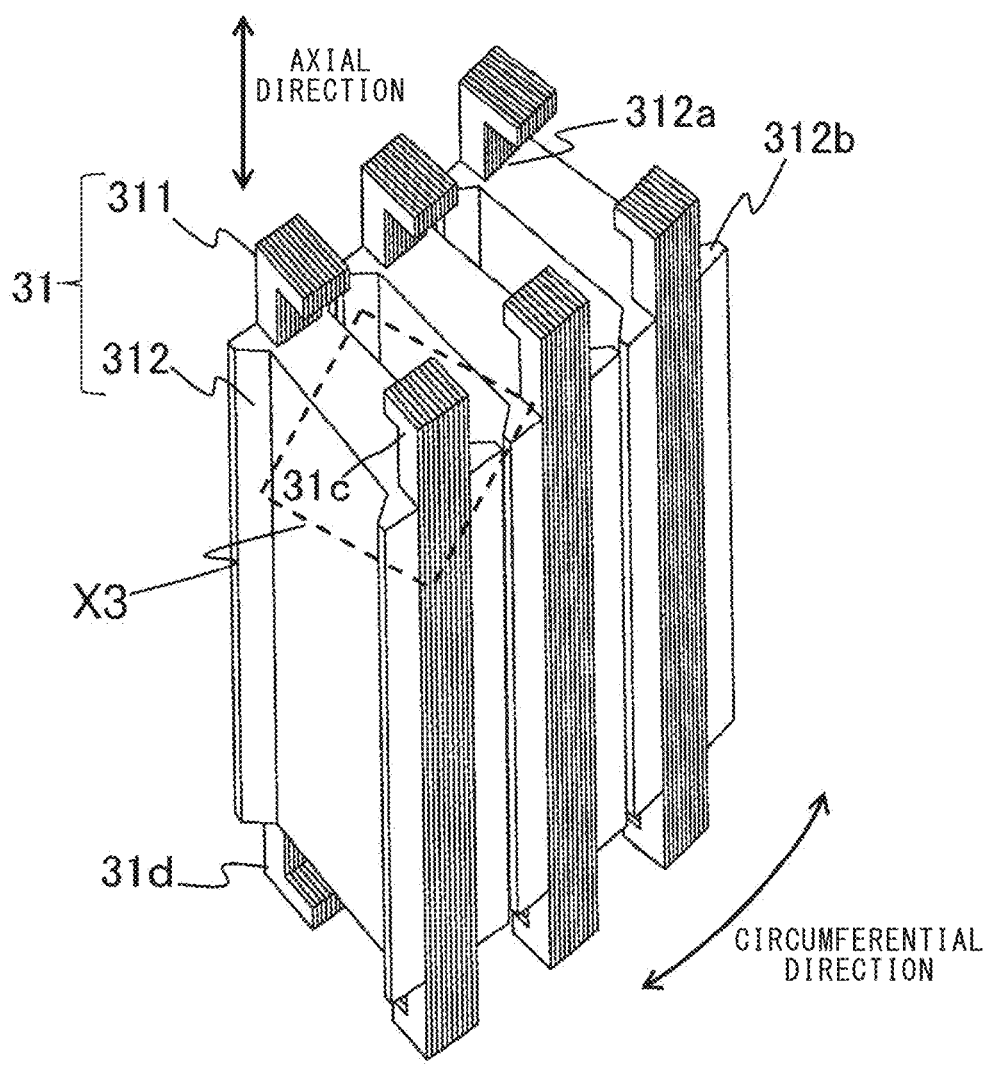
FIG. 7 is a partial perspective view showing the structure of the stator core of the rotary electric machine according to embodiment 3.
Figure 8:
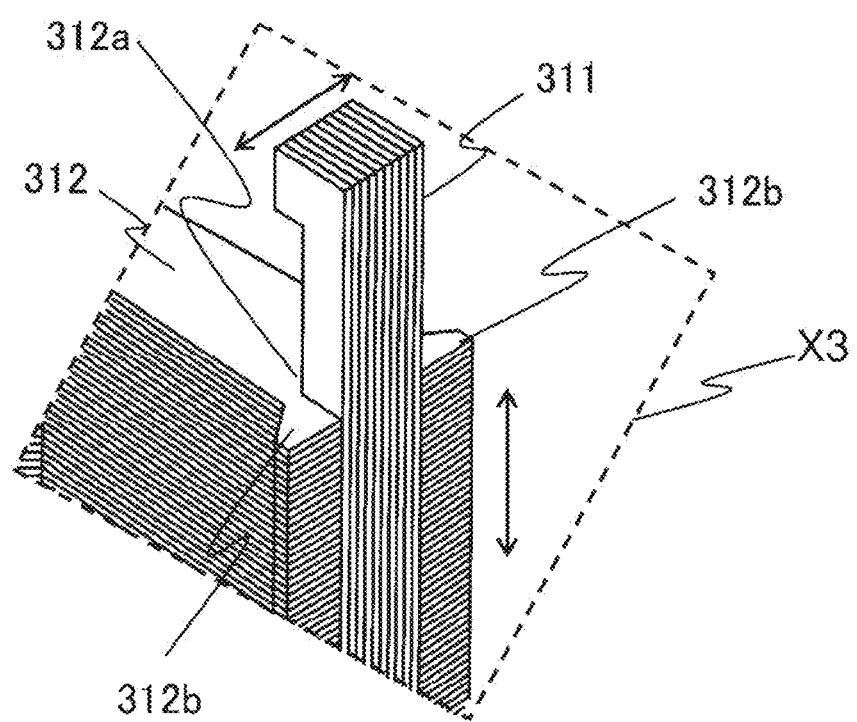
FIG. 8 is a partial perspective view showing the structure of the stator core of the rotary electric machine according to embodiment 3 and is a partial enlarged view of FIG. 7.

FIG. 6 is a perspective view showing part of the structure of the stator 30 of the rotary electric machine according to embodiment 3, FIG. 7 is a perspective view showing the structure of the stator core 31, and FIG. 8 is a partial enlarged view in a broken-line area X3 in FIG. 7. In embodiments 1 and 2, the stator core 31 is formed by stacking, substantially in the circumferential direction, i.e., the rotation direction, thin steel sheets that are long in the axial direction. In the stator core 31 of embodiments 1 and 2, at both ends in the axial direction thereof, both side portions on the inner rotor 10 side and the outer rotor 20 side extend and protrude in the axial direction from the body portion, the distal end portions 31c thereof on the load side are bent inward in L shapes, and the distal end portions 31d thereof on the non-load side are bent outward in L shapes. On the other hand, the stator core 31 of embodiment 3 is different in that the stator core 31 includes side portions 311 respectively opposed to the inner rotor 10 and the outer rotor 20, and a side-portion retention portion 312 retaining both side portions 311 and wound with the stator coil 32.

As shown in FIG. 7 and FIG. 8, both side portions 311 of the stator core 31 are formed by stacking, substantially in the circumferential direction, i.e., the rotation direction, thin electromagnetic steel sheets that are long in the axial direction. On the other hand, the side-portion retention portion 312 of the stator core 31 is formed by stacking, in the axial direction, electromagnetic steel sheets having a predetermined shape, to a height corresponding to the permanent magnets 14, 22 of the inner rotor 10 and the outer rotor 20. The side-portion retention portion 312 has substantially a rectangular shape and has cutouts 312a at center parts on the inner circumferential side which is the inner rotor side and the outer circumferential side which is the outer rotor side. In the cutouts 312a, both side portions 311 are inserted and retained. In addition, flanges 312b may be provided in the circumferential direction from the cutout 312a, as shown in the drawings. Both side portions 311 of the stator core 31 are retained in close contact with the side-portion retention portion 312 so that a magnetic flux in a direction perpendicular to the rotary shaft flows seamlessly. Both side portions 311 extend toward both sides in the axial direction from the side-portion retention portion 312 so as to have distal end portions 31c, 31d bent in L shapes. The distal end portions 31c, 31d respectively correspond to the stator core load-side retention portions 36 and the stator core non-load-side retention portions 37 shown in embodiments 1 and 2.

The stator core 31 of embodiment 3 which includes both side portions 311 stacked in the circumferential direction and the side-portion retention portion 312 stacked in the axial direction is also retained with tensile stress applied thereto in the axial direction, as in embodiments 1 and 2. That is, in relation to FIG. 1 in embodiment 1, the distal end portions 31c, 31d of both side portions of the stator core 31 are fixed and the non-load-side retention surfaces 39 in the grooves in the non-load-side stator base 33 and the load-side retention surfaces 38 in the load-side base retention member 35 are arranged so as to be opposed to each other. That is, the L-shaped parts of the distal end portions 31c on one end side in the axial direction of the side portions 311 of the stator core 31 are retained by being fitted to the grooves in the load-side base retention member 35, and the L-shaped parts of the distal end portions 31d on the other end side in the axial direction of the side portions 311 of the stator core 31 are retained by being fitted to the grooves in the non-load-side stator base 33, so that tensile stress is applied.

In FIG. 7, the distal end portions 31c, 31d in the axial direction of both side portions 311 are both bent inward toward the side-portion retention portion 312 side. However, as shown in FIG. 1 and FIG. 5, the distal end portions on the fixed side may be bent outward. In addition, as shown in FIG. 5, they may be bent in L shapes at obtuse angles.

As in both side portions 311 of the stator core 31 in embodiment 3, parts of the stator core 31 are formed by stacking, substantially in the circumferential direction, i.e., the rotation direction, thin electromagnetic steel sheets that are long in the axial direction, and are retained with tensile stress applied thereto. Thus, magnetic property deterioration due to compressive stress is suppressed and efficiency can be enhanced.

Next, the side-portion retention portion 312 for retaining the side portions 311 of the stator core 31 will be described. In embodiments 1 and 2, the stator core 31 is formed by stacking, substantially in the circumferential direction, i.e., the rotation direction, thin steel sheets that are long in the axial direction. On the other hand, in embodiment 3, the side portions 311 are formed on both of the inner circumferential side and the outer circumferential side by stacking, substantially in the circumferential direction, i.e., the rotation direction, thin steel sheets that are long in the axial direction as in embodiments 1 and 2, and the side-portion retention portion 312 for retaining both side portions 311 is formed by stacking electromagnetic steel sheets in the axial direction. Therefore, as described above, in a direction perpendicular to the axis, a substantially rectangular piece corresponding to each of electromagnetic steel sheets composing the side-portion retention portion 312 is present and thus it becomes easy to perform working into a desired shape. As shown in FIG. 7 and FIG. 8, the side-portion retention portion 312 has substantially a rectangular shape and has, at center parts on the inner circumferential side and the outer circumferential side, the cutouts 312a in which both side portions 311 are inserted and retained. The flanges 312b are provided in the circumferential direction from the cutout 312a. Working into such a shape also becomes easy.

Meanwhile, as shown in FIG. 4, in the axial-direction cross-section of the rotary electric machine 1, the stator 30 is provided between the inner rotor 10 and the outer rotor 20, and the stator cores 31 are arranged at constant intervals. Therefore, a magnetic flux due to the structure in which permeability is not constant as seen from the gaps between the stator 30, and the inner rotor 10 and the outer rotor 20, is generated. The generated magnetic flux is called a spatial harmonic, leading to loss.

In the present embodiment, the side-portion retention portions 312 have the flanges 312b serving to fill spaces between circumferential-direction adjacent parts of the stator 30, whereby a spatial harmonic can be reduced. In addition, since the side-portion retention portion 312 is stacked in the rotary shaft direction, the area of the conductor interlinked by a circumferential-direction interlinkage magnetic flux is small. Thus, the resistance of the conductor increases and eddy current can be reduced.

Next, a method for attachment between the side portions 311 and the side-portion retention portion 312 will be described.

Figures 9A, 9B:
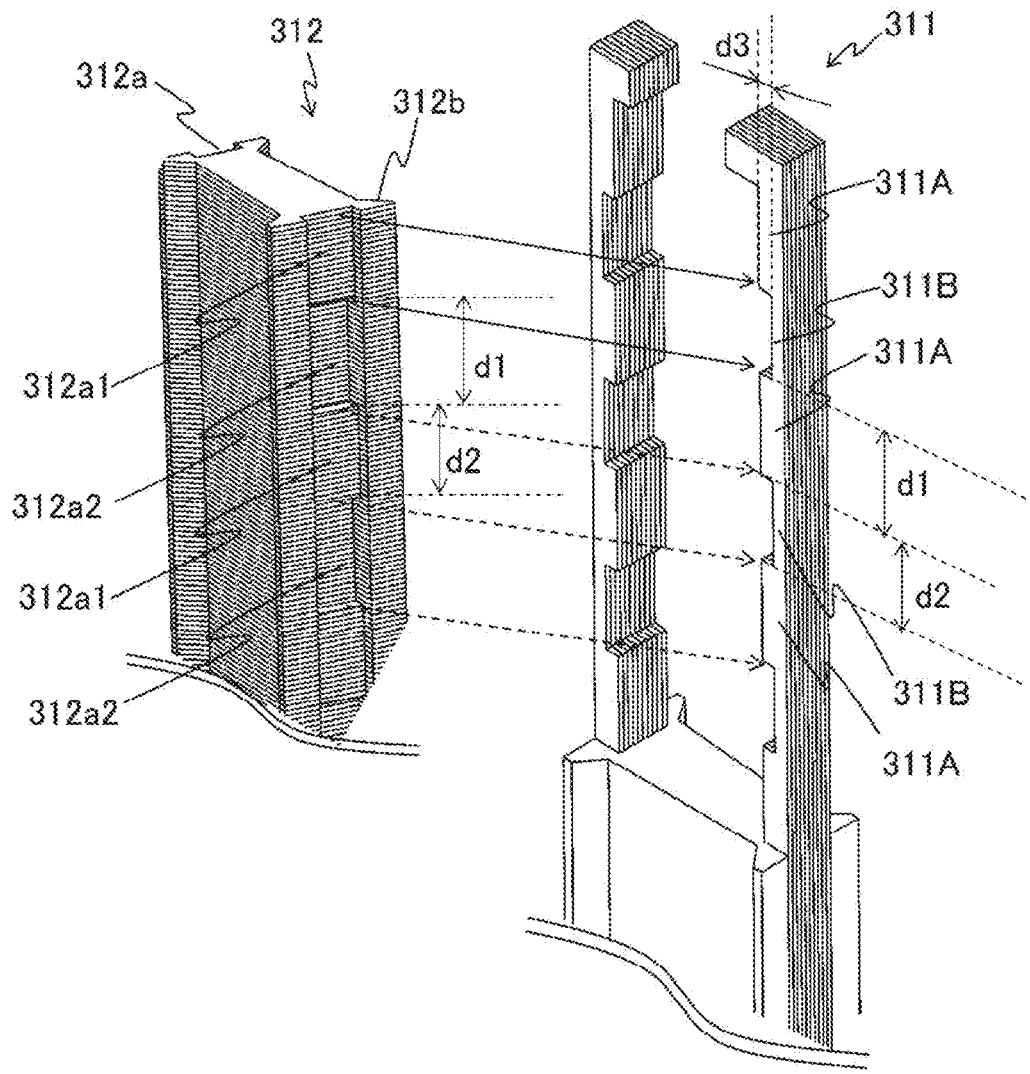
FIGS. 9A and 9B are a perspective view showing a method for assembling the stator core of the rotary electric machine according to embodiment 3.

FIG. 9A shows the side-portion retention portion 312 stacked in the axial direction and FIG. 9B shows both side portions 311 stacked in the circumferential direction. The cutout 312a of the side-portion retention portion 312 includes two types of cutouts, i.e., shallowly-cut cutouts 312a1 and deeply-cut cutouts 312a2, and the side-portion retention portion 312 is stacked such that the cutouts 312a1 and 312a2 have predetermined thicknesses d2, d1, respectively. On both of the inner circumferential side and the outer circumferential side, the stacked parts at the shallowly-cut cutouts 312a1 project relative to the stacked parts at the deeply-cut cutouts 312a2.

The side portions 311 are arranged such that the inner circumferential side and the outer circumferential side thereof are opposed to each other, and have, on the retention portion sides, protruding parts 311A and recessed parts 311B sequentially formed in lengths corresponding to the thicknesses d1, d2, respectively. A level difference d3 between the protruding part 311A and the recessed part 311B corresponds to the difference between the cutting depths of the shallowly-cut cutout 312a1 and the deeply-cut cutout 312a2 of the side-portion retention portion 312. The side-portion retention portion 312 in FIG. 9A and both side portions 311 in FIG. 9B are fitted such that the stacked part at the shallowly-cut cutout 312a1 and the recessed part 311B are fitted to each other and the stacked part at the deeply-cut cutout 312a2 and the protruding part 311A are fitted to each other. That is, the recess and protrusion shapes of both members are fitted to each other in the direction of arrows in the drawing, thus forming the stator core 31 as shown in FIG. 6.

As described above, since the recess and protrusion shapes formed on the cutouts 312a of the side-portion retention portion 312 and the recess and protrusion shapes formed on both side portions 311 are fitted to each other, the stator core 31 can be formed in a state in which the thin-sheet-shaped electromagnetic steel sheets stacked in directions different from each other are in close contact with each other without coming apart.

The recess and protrusion shapes formed on the cutouts 312a of the side-portion retention portion 312 and the recess and protrusion shapes formed on both side portions 311 are not limited to the above ones. For example, shapes not only for fitting in the radial direction but also for fitting or engaging in the axial direction may be adopted.

Figure 10:
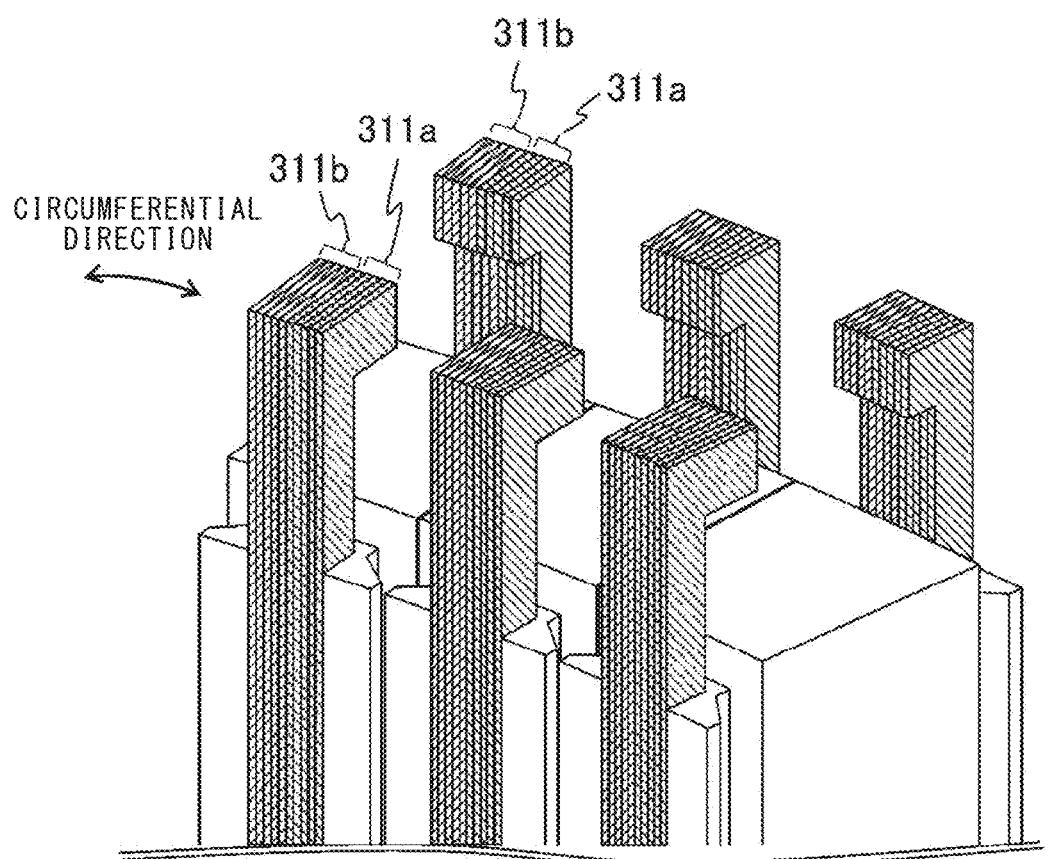
FIG. 10 is a partial perspective view showing the structure of another stator of the rotary electric machine according to embodiment 3.

FIG. 10 shows a modification of FIG. 6 and is a perspective view showing the configuration of another stator 30 according to embodiment 3. Difference from FIG. 6 is that, in both side portions 311 of the stator core 31, parts on the rotation-direction advanced side in FIG. 4 are formed by structural bodies 311b which are not stacked electromagnetic steel sheets and are made of a non-metal or non-magnetic material. Parts on the rotation-direction lagged side are formed by stacked bodies 311a of electromagnetic steel sheets.

In electromagnetic steel sheets stacked in the circumferential direction, in-plane eddy current is generated and the generated eddy current tends to be greater on the rotation-direction advanced side. Therefore, if the parts on the rotation-direction advanced side are formed by members that are not electromagnetic steel sheets as shown in FIG. 10, loss due to eddy current on the rotation-direction advanced side can be reduced. In the present embodiment, high-strength resin is used as the structural bodies 311b made of a non-metal or non-magnetic material. The shapes of the structural bodies 311b and the stacked bodies 311a of electromagnetic steel sheets are not limited to the shown ones, and they may be different in size in the circumferential direction, or the like.

As described above, according to embodiment 3, both side portions 311 composing the stator core 31 are formed by stacking, substantially in the circumferential direction, i.e., the rotation direction, thin electromagnetic steel sheets that are long in the axial direction, and tensile stress is applied thereto. Thus, as in embodiments 1 and 2, magnetic property deterioration due to compressive stress is suppressed and efficiency can be enhanced.

In addition, the side-portion retention portion 312 of the stator core for retaining both side portions 311 is formed by stacking substantially-rectangular electromagnetic steel sheets in the axial direction, and has flange shapes on the inner circumferential side and the outer circumferential side. Such a structure contributes to suppression of a spatial harmonic and eddy current, thus achieving efficiency enhancement.

Further, in both side portions 311 composing the stator core 31, parts on the rotation-direction advanced side are formed by the structural bodies 311b which are not stacked bodies of electromagnetic steel sheets and are made of a non-metal or non-magnetic material. Thus, it becomes possible to reduce loss due to eddy current.

Embodiment 4

Hereinafter, a rotary electric machine according to embodiment 4 will be described with reference to the drawings.

Figure 11:
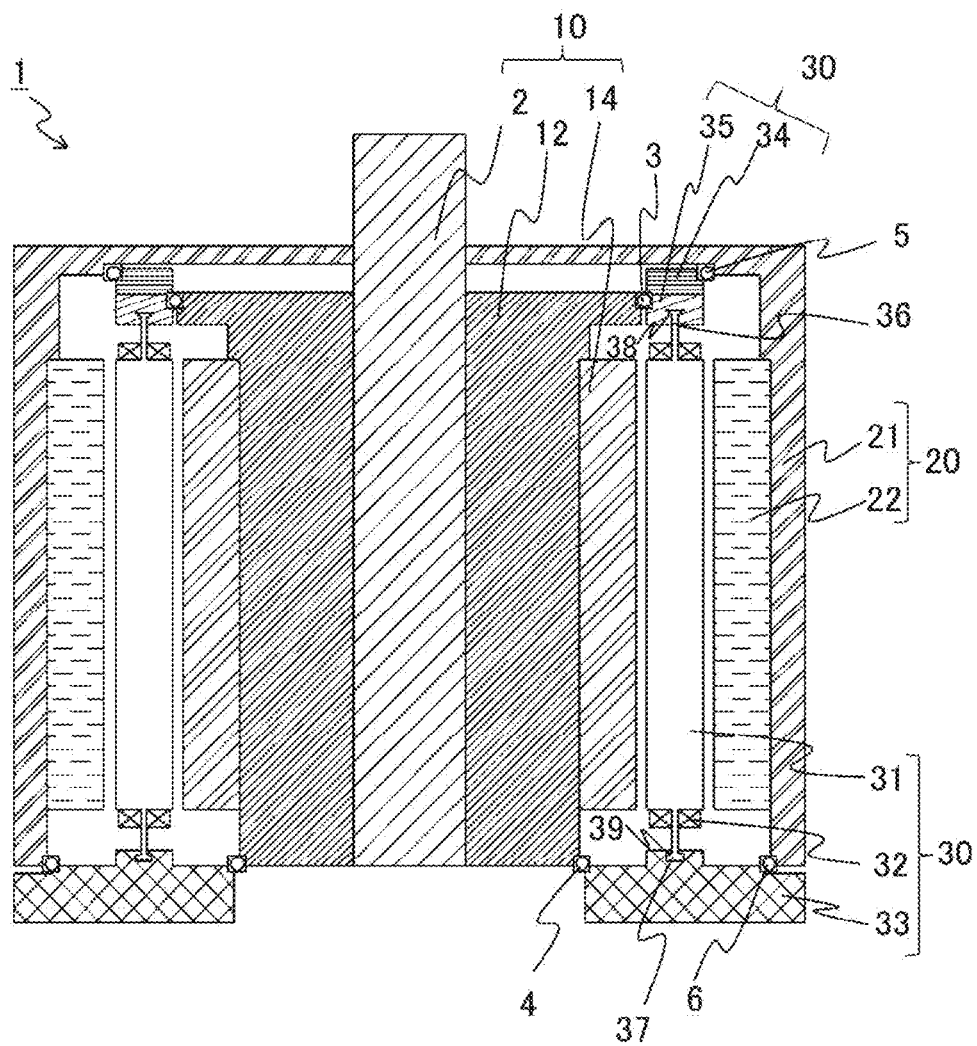
FIG. 11 is a sectional view along a rotary shaft of a rotary electric machine according to embodiment 4.

FIG. 11 is a sectional view along the rotary shaft of the rotary electric machine 1 according to embodiment 4. In FIG. 11, difference from embodiment 1 is that, at both ends in the axial direction, radial-direction center parts of the stator core 31 extend and protrude in the axial direction while having smaller widths than the width of the stator core 31 opposed to the inner rotor 10 and the outer rotor 20. The stator core load-side retention portion 36 which is the protruding distal end portion on the load side and the stator core non-load-side retention portion 37 which is the protruding distal end portion on the fixed side are formed in T shapes. In the T shape, a connection portion between a part extending in the axial direction and a part extending in the radial direction has a tapered shape. The stator core 31 is formed of an electromagnetic steel sheet, and the stator core load-side retention portion 36 and the stator core non-load-side retention portion 37 are parts of the stator core 31 and are formed of the same steel sheet.

As in embodiments 1 and 2, the stator core load-side retention portion 36 which is the distal end portion extended toward the load side which is one side in the axial direction is inserted in the groove in the load-side base retention member 35 attached to the load-side stator base 34. At this time, the load-side retention surface 38 of the radial-direction part of the stator core load-side retention portion 36 formed in the T shape is fixed in contact with the groove in the load-side base retention member 35.

The stator core non-load-side retention portion 37 which is the distal end portion extended toward the non-load-side which is the other side in the axial direction is inserted in the groove in the non-load-side stator base 33. At this time, the non-load-side retention surface 39 of the radial-direction part of the stator core non-load-side retention portion 37 formed in the T shape is fixed in contact with the non-load-side stator base 33.

Also in the present embodiment, in the stator core 31, the direction in which the load-side retention surface 38 contacts with the load-side base retention member 35 and the direction in which the non-load-side retention surface 39 contacts with the non-load-side stator base 33 are opposed to each other in the axial direction, though mutually having some components in the radial direction.

As described above, also with the configuration in embodiment 4, the same effects as in embodiment 1 are provided. In addition, the stator core load-side retention portion 36 and the stator core non-load-side retention portion 37 have T shapes, and the radial-direction dimensions of the stator core load-side retention portion 36 and the stator core non-load-side retention portion 37 are small relative to the areas of the load-side retention surface 38 and the non-load-side retention surface 39. Therefore, the sizes of the opening of the load-side base retention member 35 attached to the load-side stator base 34 and the opening of the non-load-side stator base 33 can be reduced. In addition, since the stator core load-side retention portion 36 and the stator core non-load-side retention portion 37 are each provided at one part in the axial direction, the number of the retention portions can be decreased and thus size reduction can be achieved. Further, in the T shapes of the stator core load-side retention portion 36 and the stator core non-load-side retention portion 37, the connection portion between the part extending in the axial direction and the part extending in the radial direction has a tapered shape. Therefore, the connection portion can be ensured to have a certain strength.

Embodiment 5

Hereinafter, a rotary electric machine according to embodiment 5 will be described with reference to the drawings.

Figure 12:
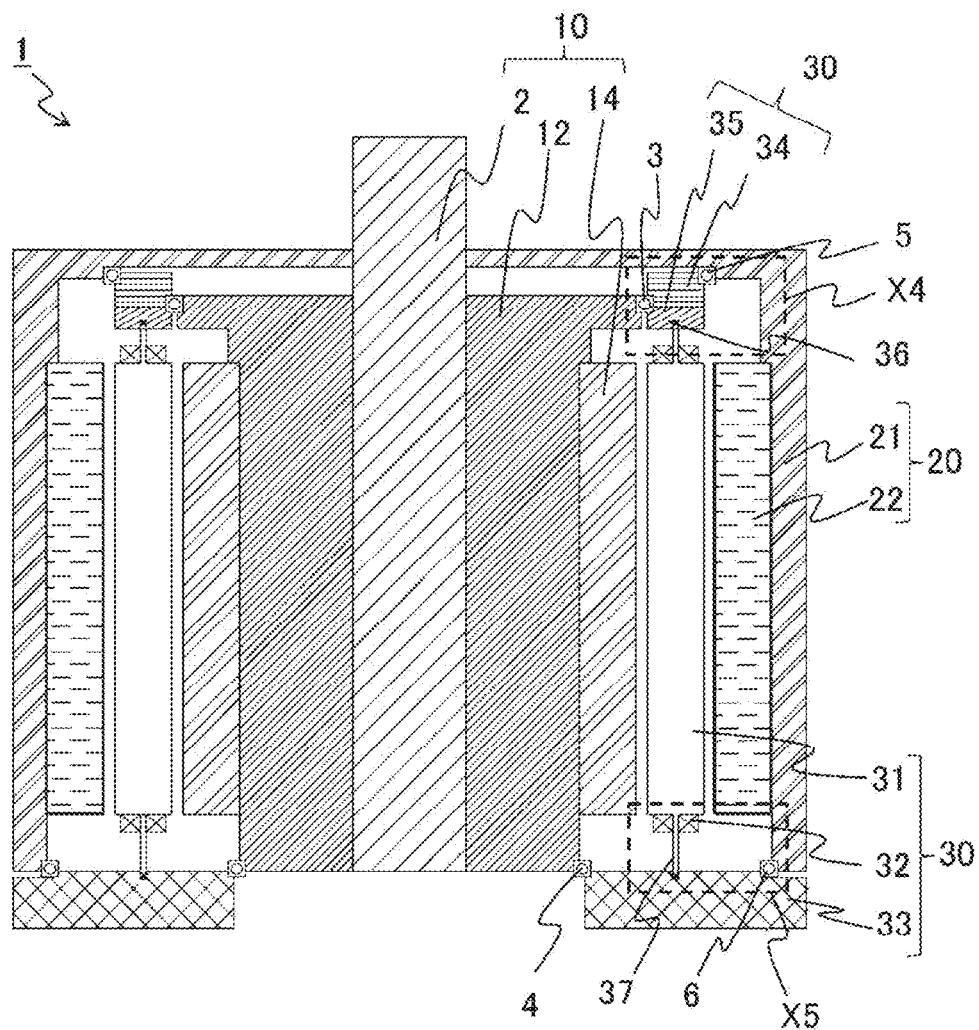
FIG. 12 is a sectional view along a rotary shaft of a rotary electric machine according to embodiment 5.

FIG. 12 is a sectional view along the rotary shaft of the rotary electric machine 1 according to embodiment 5. In FIG. 12, difference from embodiment 1 is that, at both ends in the axial direction, radial-direction center parts of the stator core 31 extend and protrude in the axial direction while having smaller widths than the width of the stator core 31 opposed to the inner rotor 10 and the outer rotor 20. In addition, difference from embodiment 4 is that the distal end portions extending and protruding in the axial direction have engagement holes. The stator core 31 is formed of an electromagnetic steel sheet, and the stator core load-side retention portion 36 and the stator core non-load-side retention portion 37 are parts of the stator core 31 and are formed of the same steel sheets.

Figure 13:
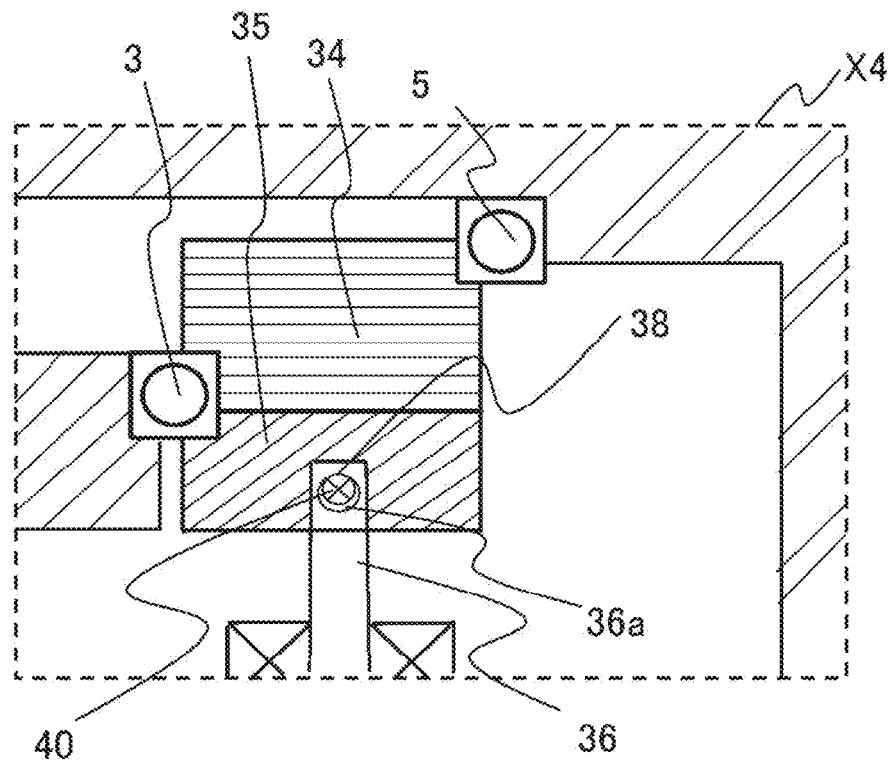
FIG. 13 is a sectional view along the rotary shaft of the rotary electric machine according to embodiment 5 and is a partial enlarged view of FIG. 12.
Figure 14:
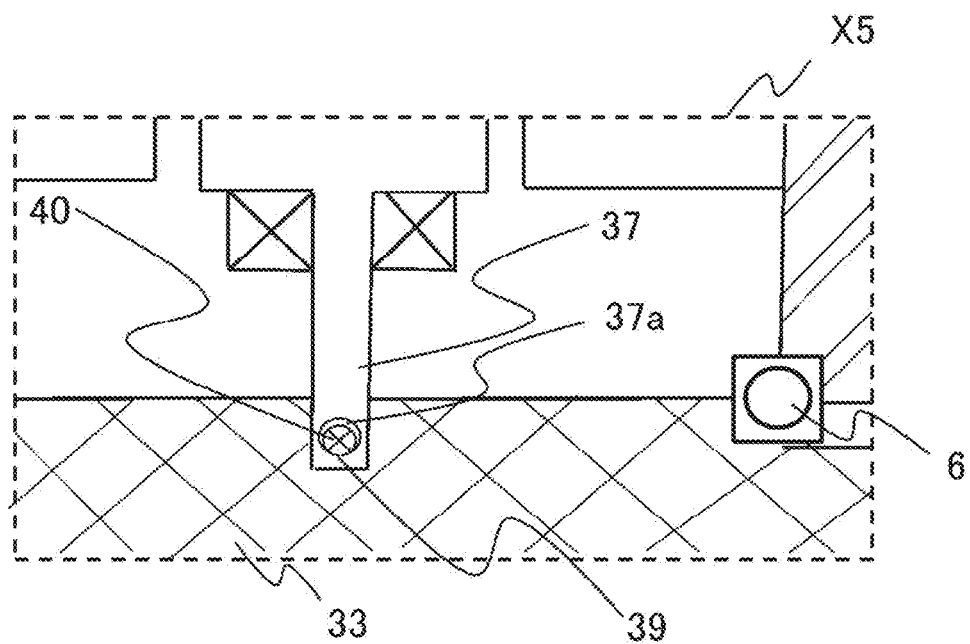
FIG. 14 is a sectional view along the rotary shaft of the rotary electric machine according to embodiment 5 and is a partial enlarged view of FIG. 12.

FIG. 13 is an enlarged view in an area X4 enclosed by a broken line in FIG. 12, and FIG. 14 is an enlarged view in an area X5 enclosed by a broken line in FIG. 12. FIG. 13 and FIG. 14 show structures at both ends in the axial direction of the stator core 31.

In the drawings, a hole 36a provided in the stator core load-side retention portion 36 which is the distal end portion extended toward the load side which is one side in the axial direction is fitted to a fixation pin 40 attached to the load-side base retention member 35, and thus the load-side retention surface 38 is fixed to the load-side stator base 34 while contacting with the fixation pin 40 of the load-side base retention member 35.

A hole 37a provided in the stator core non-load-side retention portion 37 which is the distal end portion extended toward the non-load side which is the other side in the axial direction is fitted to a fixation pin 40 attached to the non-load-side stator base 33, and thus the non-load-side retention surface 39 is fixed to the non-load-side stator base 33 while contacting with the fixation pin 40 of the non-load-side stator base 33.

Also in the present embodiment, the direction in which the load-side retention surface 38 contacts with the load-side base retention member 35 and the direction in which the non-load-side retention surface 39 contacts with the non-load-side stator base 33 are opposed to each other in the axial direction, though mutually having some components in the radial direction.

As described above, also with the configuration in embodiment 5, the same effects as in embodiment 1 are provided. In addition, since the stator core load-side retention portion 36 and the stator core non-load-side retention portion 37 are engaged with the fixation pins 40, openings for inserting the stator core load-side retention portion 36 and the stator core non-load-side retention portion 37 in the non-load-side stator base 33 and the load-side stator base 34 are not needed, and thus size reduction can be achieved. In addition, as in embodiment 4, since the stator core load-side retention portion 36 and the stator core non-load-side retention portion 37 are each provided at one part in the axial direction, the number of the retention portions can be decreased and this also contributes to size reduction.

Embodiment 6

Hereinafter, a rotary electric machine according to embodiment 6 will be described with reference to the drawings.

Figure 15:
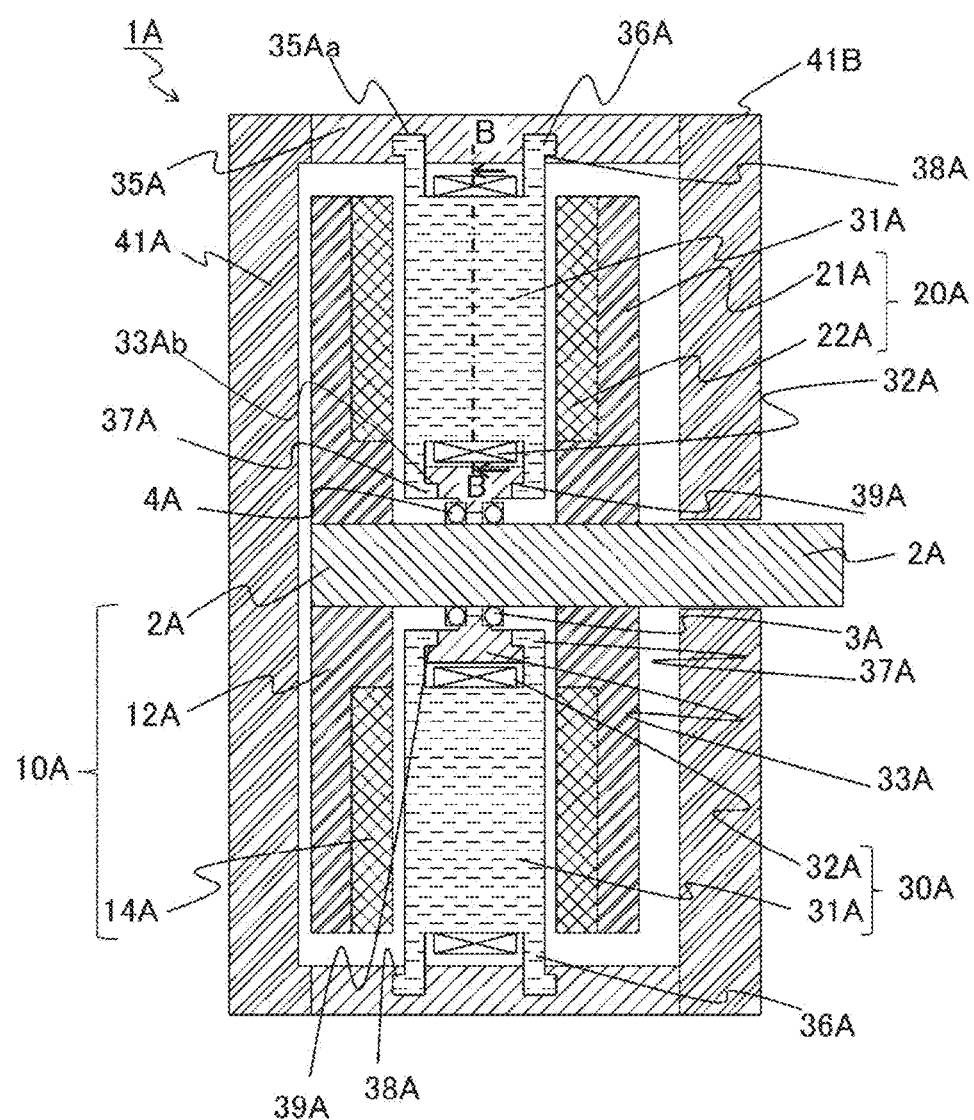
FIG. 15 is a sectional view along a rotary shaft of a rotary electric machine according to embodiment 6.
Figure 16:
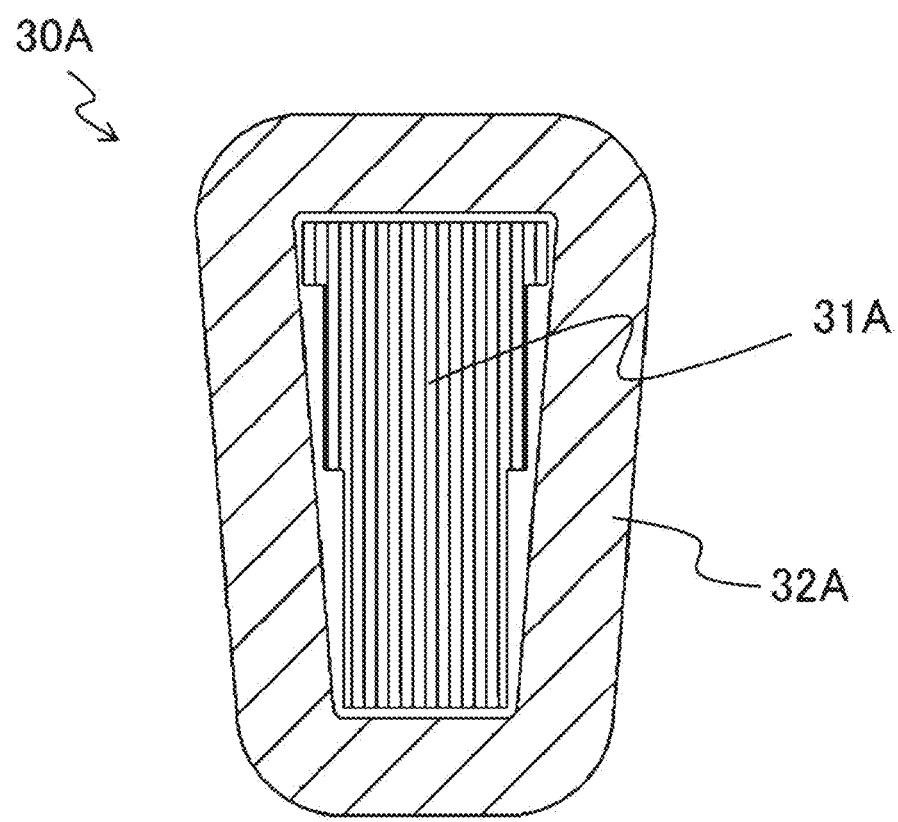
FIG. 16 is a sectional view along a direction perpendicular to the rotary shaft of the rotary electric machine according to embodiment 6 and shows the structure of a stator.

FIG. 15 is a sectional view along the rotary shaft, showing the structure of a rotary electric machine 1A according to embodiment 6, and FIG. 16 is a sectional view showing the structure of a stator 30A and is a partial sectional view along a B-B line direction in FIG. 15. In the drawings, the rotary electric machine 1A includes two rotors which are a non-load-side rotor 10A and a load-side rotor 20A, and a stator 30A provided between the two rotors in the radial direction, and is formed as an axial gap motor of a double-rotor type.

The non-load-side rotor 10A includes a shaft 2A, a non-load-side boss 12A press-fitted and fixed to the shaft 2A, and a permanent magnet 14A adhered and fixed to the load side of the non-load-side boss 12A.

The load-side rotor 20A includes a load-side boss 21A fixed to the shaft 2A, and a permanent magnet 22A adhered and fixed to the non-load side of the load-side boss 21A.

The stator 30A is provided between the non-load-side rotor 10A and the load-side rotor 20A, and rotatably retains the non-load-side rotor 10A and the load-side rotor 20A by a load-side inner bearing 3A and a non-load-side inner bearing 4A.

In the stator 30A, a stator core 31A is provided between a radially-outer-side retention member 35A and a radially-inner-side retention member 33A, and a stator coil 32A is wound around the stator core 31A. The radially-outer-side retention member 35A is attached to a non-load-side base 41A and a load-side base 41B provided separately from the shaft 2A, thus surrounding the two rotors, i.e., the non-load-side rotor 10A and the load-side rotor 20A. The shaft 2A rotatably protrudes from a center part of the load-side base 41B and is separate from the load-side base 41B.

The stator core 31A is formed by stacking, substantially in the circumferential direction, i.e., the rotation direction, thin steel sheets that are long in the radial direction. At both ends in the radial direction, both radial-direction side portions of the stator core 31A on the non-load-side rotor 10A side and the load-side rotor 20A side extend and protrude.

Of both protruding side portions of the stator core 31A, stator core radially-outer-side retention portions 36A on the radially outer side have L-shaped distal end portions bent outward in the axial direction, i.e., bent such that both side portions are separated from each other. Each L-shaped part is engaged with a groove 35Aa in the radially-outer-side retention member 35A, and a radially-outer-side retention surface 38A of the stator core radially-outer-side retention portion 36A on the radially outer side is fixed in contact with the groove 35Aa.

Of both protruding side portions of the stator core 31A, stator core radially-inner-side retention portions 37A on the radially inner side have L-shaped distal end portions bent inward in the axial direction, i.e., bent such that both side portions are opposed to each other. Each of them is engaged with an L-shaped groove 33Ab provided in the radially-inner-side retention member 33A, and a radially-inner-side retention surface 39A of the stator core radially-inner-side retention portion 37A is fixed in contact with the groove 33Ab.

In the stator core 31A, the direction in which the radially-outer-side retention surface 38A contacts with the groove 35Aa in the radially-outer-side retention member 35A and the direction in which the radially-inner-side retention surface 39A contacts with the groove 33Ab provided in the radially-inner-side retention member 33A are opposed to each other in the radial direction. That is, the stator core 31A is fixed with tensile stress applied thereto.

Also in the configuration of the axial gap motor according to embodiment 6, the stator core 31A is fixed with tensile stress applied thereto, whereby the same effects as in embodiment 1 are provided. That is, magnetic property deterioration due to compressive stress does not occur and torque is improved. Thus, a high-efficiency rotary electric machine can be provided.

The rotary electric machine 1A according to embodiment 6 has a concentrated-winding configuration with 10 poles and 12 slots. The stator core 31A is formed by stacking, substantially in the circumferential direction, thin steel sheets that are long in the radial direction, as described above. The non-load-side rotor 10A and the load-side rotor 20A rotate at the same angular velocity.

The thin steel sheets of the stator core 31A are electromagnetic steel sheets manufactured by rolling, and are arranged such that the rolling direction coincides with the axial direction of the stator core 31A, i.e., the direction in which the non-load-side rotor 10A and the load-side rotor 20A are opposed to each other.

Embodiment 7

Hereinafter, a magnetic gear as a rotary electric machine according to embodiment 7 will be described with reference to the drawings.

Figure 17:
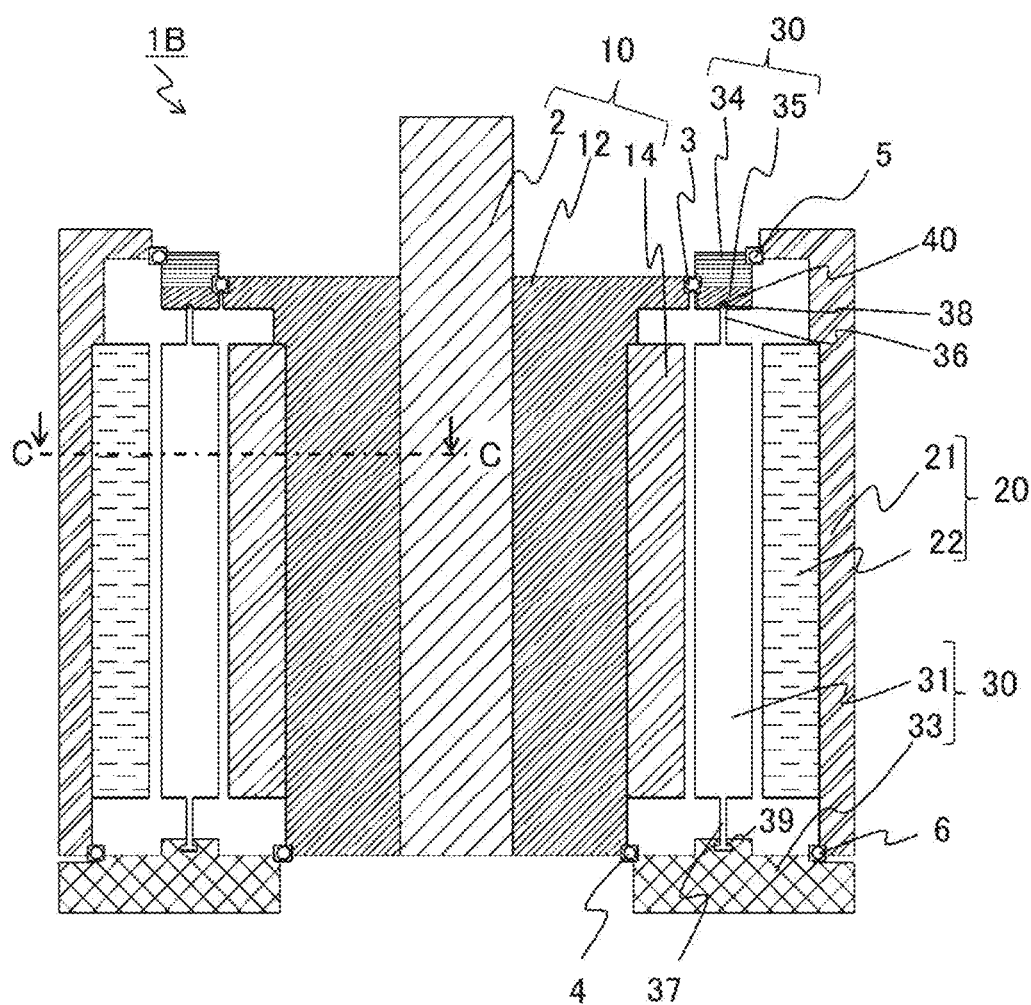
FIG. 17 is a sectional view along a rotary shaft of a rotary electric machine according to embodiment 7.
Figure 18:
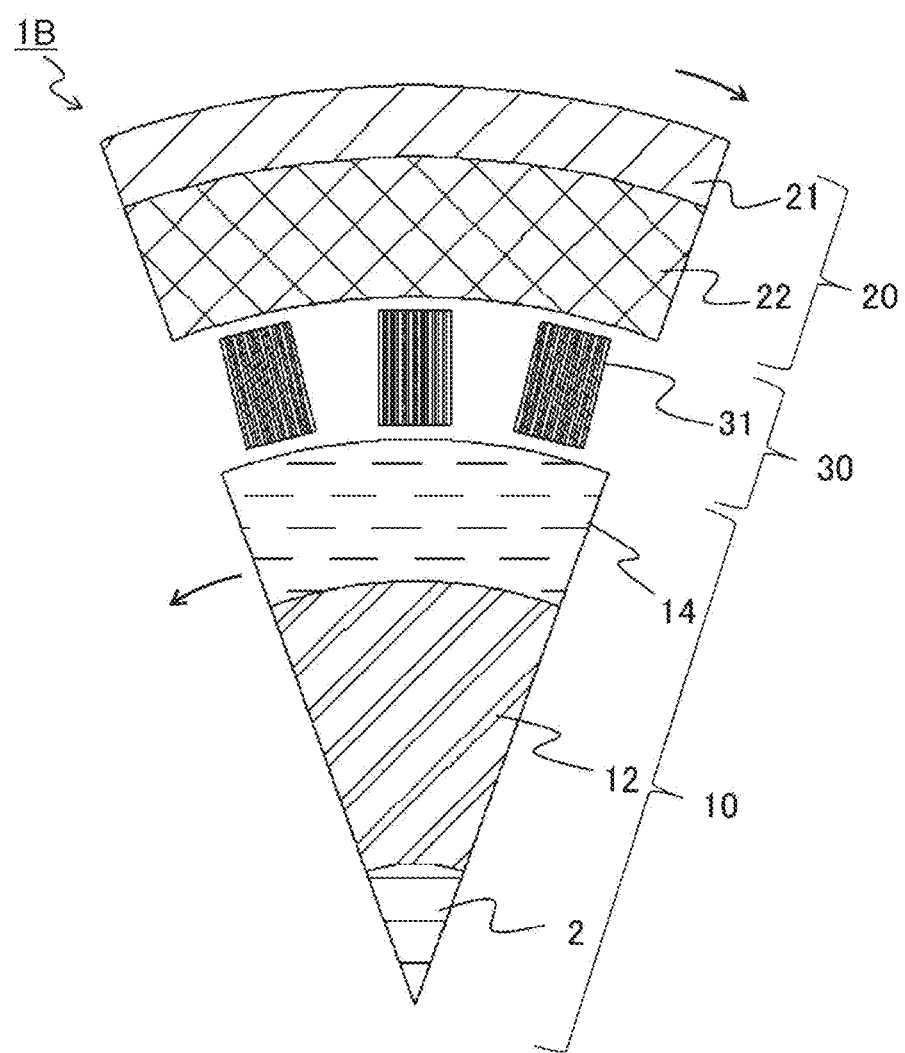
FIG. 18 is a partial sectional view along a direction perpendicular to the rotary shaft of the rotary electric machine according to embodiment 7.

FIG. 17 is a sectional view along the rotary shaft, showing the structure of a magnetic gear 1B according to embodiment 7, and FIG. 18 is a partial sectional view along a C-C line direction. The magnetic gear 1B does not include the stator coil 32. As shown in FIG. 18, the stator core 31 is flat and does not have bent portions (flanges) at both side portions in the radial direction. For the inner rotor 10 and the outer rotor 20, the stator cores 31 serve as pole pieces for modulating magnetic fluxes of the inner rotor 10 and the outer rotor 20 in accordance with greatness/smallness of magnetic resistance based on presence/absence of the stator cores 31 in the circumferential direction.

In FIG. 17 and FIG. 18, the inner rotor 10 and the outer rotor 20 of the magnetic gear 1B are not connected to each other. The inner rotor 10 rotates counterclockwise in the drawing, and the outer rotor 20 rotates clockwise in the drawing at the same electric angular velocity as the inner rotor 10. Here, for example, it is assumed that the number of poles of the outer rotor 20 is 60 and the number of poles of the inner rotor 10 is 12, so that the number of poles of the outer rotor 20 is 5 times the number of poles of the inner rotor 10. In this case, the magnetic gear having a speed reduction ratio of 5 can be obtained. While the number of poles of the outer rotor 20 which is a low-speed rotor is 60 and the number of poles of the inner rotor 10 which is a high-speed rotor is 12, the number of the stator cores 31 which are pole pieces in the circumferential direction is set to satisfy (number of pole pieces)=(number of poles of low-speed rotor)±(number of poles of high-speed rotor).

Therefore, the number of the stator cores 31 is 60±12=72 or 48, and in this example, is set to 48.

At both ends in the axial direction, radial-direction center parts of the stator core 31 extend and protrude in the axial direction. The stator core load-side retention portion 36 which is the distal end portion extended toward the load side which is one side in the axial direction has an engagement hole as in embodiment 4, and the hole is fitted to the fixation pin 40 of the load-side base retention member 35 provided to the load-side stator base 34, so that the load-side retention surface 38 is fixed in contact with the fixation pin 40 of the load-side base retention member 35.

The stator core non-load-side retention portion 37 which is the distal end portion extended toward the non-load side which is the other side in the axial direction is formed in a T shape as in embodiment 3 and is inserted in the groove in the non-load-side stator base 33. At this time, the non-load-side retention surface 39 of the radial-direction part of the stator core non-load-side retention portion 37 formed in the T shape is fixed in contact with the non-load-side stator base 33.

The stator core 31 is formed of an electromagnetic steel sheet, and the stator core load-side retention portion 36 and the stator core non-load-side retention portion 37 are parts of the stator core 31 and are formed of the same steel sheet. The other configurations are the same as in embodiment 1.

Also in the present embodiment, in the stator core 31, the direction in which the load-side retention surface 38 contacts with the load-side base retention member 35 and the direction in which the non-load-side retention surface 39 contacts with the non-load-side stator base 33 are opposed to each other in the axial direction, though mutually having some components in the radial direction. That is, the stator core 31 is fixed with tensile stress applied thereto.

As described above, also with the structure of the magnetic gear according to embodiment 7, the same effects as in embodiment 1 are provided. That is, in the magnetic gear 1B, the stator core 31 is extended in the axial direction and fixed with tensile stress applied thereto, whereby the stator core 31 can be retained without deteriorating the magnetic property thereof. Thus, efficiency and torque of the magnetic gear can be enhanced. In addition, since the stator core load-side retention portion 36 and the stator core non-load-side retention portion 37 are each provided at one part in the axial direction, the number of the retention portions can be decreased and thus size reduction can be achieved.

Also in the other embodiments, the retention structures of the stator core load-side retention portion 36 and the stator core non-load-side retention portion 37 may be different from each other as in the present embodiment.

In the above description, it is described that the rotation directions of the inner rotor 10 and the outer rotor 20 are opposite to each other, but their rotation directions may be the same. In this case, the number of the stator cores 31 which are pole pieces may be 72 instead of 48. In addition, the numbers of poles of the inner rotor 10 and the outer rotor 20 may be set in accordance with the change gear ratio of the magnetic gear for targets to be driven by the inner rotor 10 and the outer rotor 20.

Embodiment 8

Hereinafter, a rotary electric machine according to embodiment 8 will be described with reference to the drawings.

Figure 19:
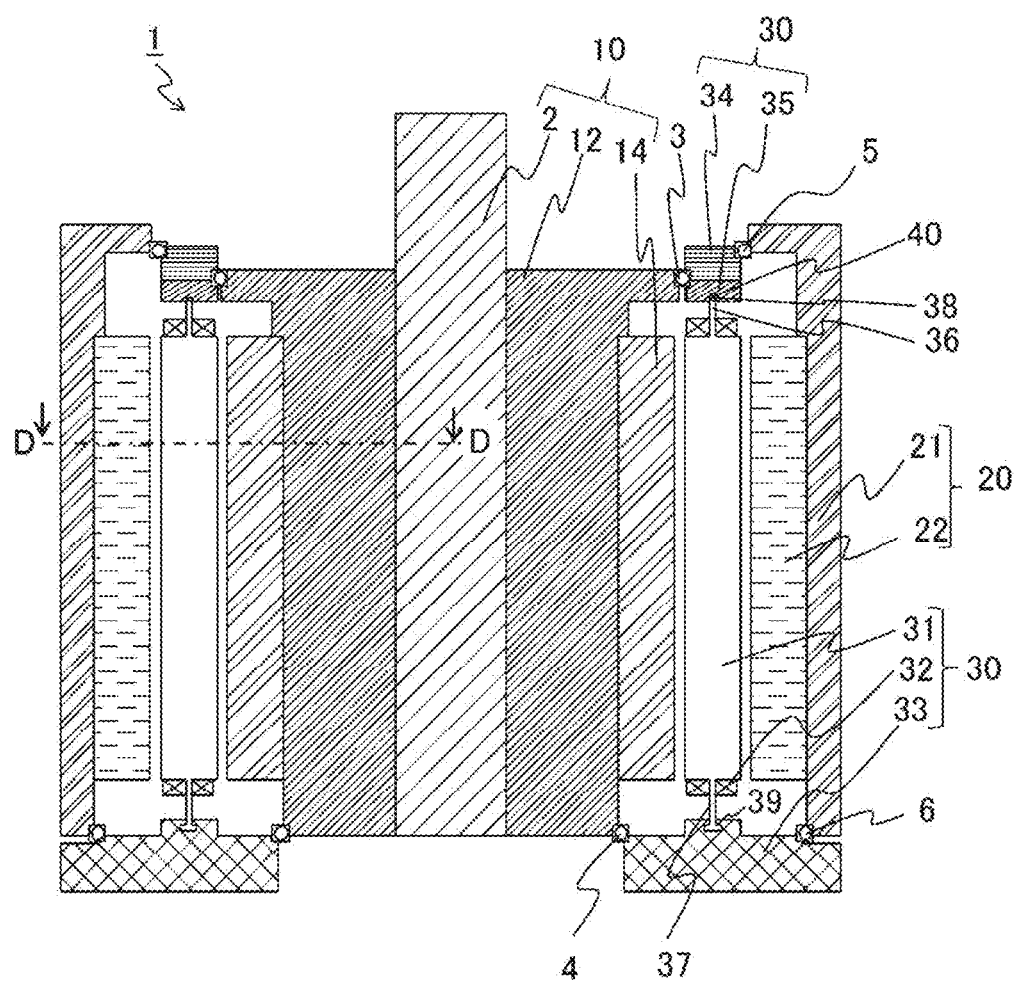
FIG. 19 is a sectional view along a rotary shaft of a rotary electric machine according to embodiment 8.

FIG. 19 is a sectional view along the rotary shaft, showing the structure of the rotary electric machine 1 according to embodiment 8. In FIG. 19, difference from embodiment 1 is that the outer shaft 21 is not fixed to the shaft 2. This rotary electric machine 1 corresponds to a magnetic geared motor obtained by winding the stator coil 32 around the magnetic gear of embodiment 7. Therefore, the inner rotor 10 and the outer rotor 20 of the rotary electric machine 1 are not connected to each other, and for example, the inner rotor 10 and the outer rotor 20 rotate in directions opposite to each other, and the outer rotor 20 rotates at an angular velocity that is ½ of the angular velocity of the inner rotor 10.

Figure 20:
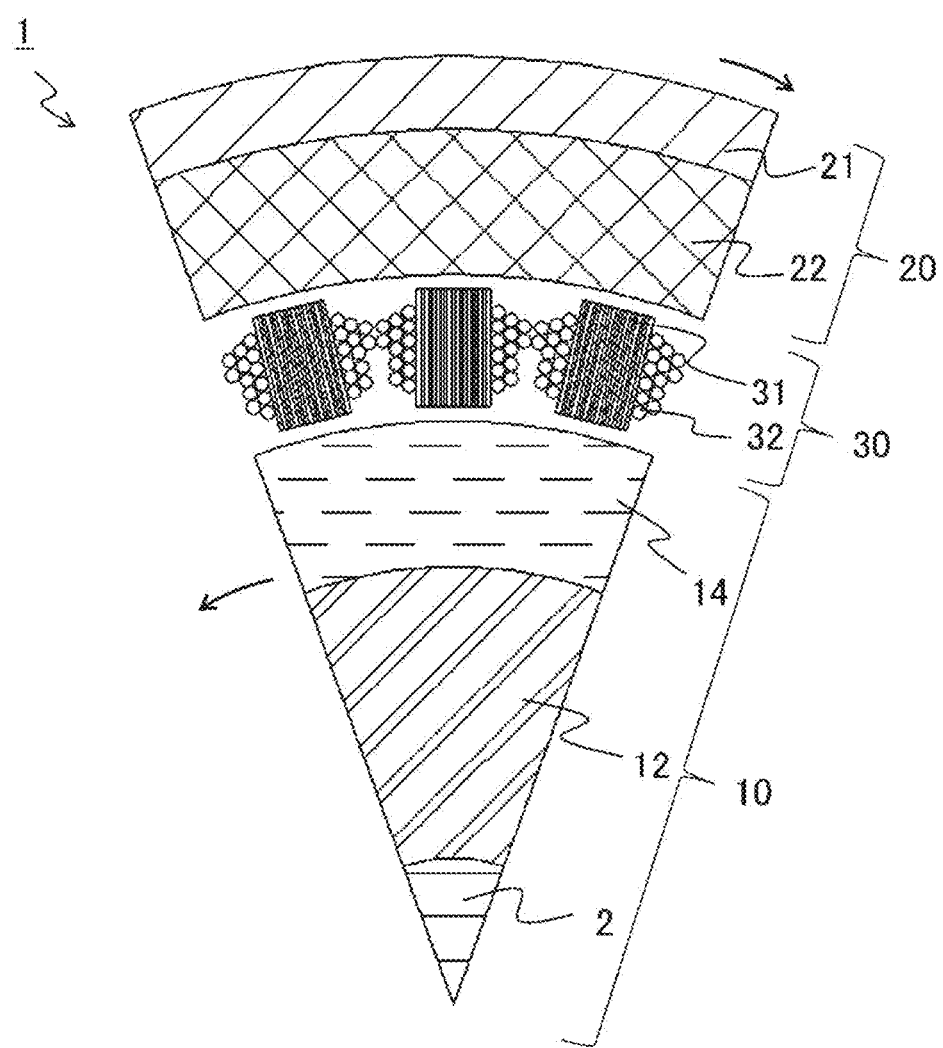
FIG. 20 is a partial sectional view along a direction perpendicular to the rotary shaft of the rotary electric machine according to embodiment 8.

FIG. 20 is a sectional view along a direction perpendicular to the rotary shaft of the rotary electric machine 1 and is a partial sectional view along a D-D line direction in FIG. 19. In FIG. 20, the inner rotor 10 rotates counterclockwise and the outer rotor 20 rotates clockwise. The stator core 31 is formed by stacking, substantially in the circumferential direction, thin electromagnetic steel sheets that are long in the axial direction. The side portions which are both side portions along the axial direction of the stator core 31 and are opposed to the inner rotor 10 and the outer rotor 20, do not have bent portions (flanges).

The other configurations are the same as in embodiment 1, and as described in embodiment 7, the stator core 31 in embodiment 8 is also attached with tensile stress applied thereto.

In the above description, the example in which the inner rotor 10 and the outer rotor 20 rotate in directions opposite to each other and the angular velocity of the outer rotor 20 is ½ of that of the inner rotor 10, has been shown. However, the rotation directions of the inner rotor 10 and the outer rotor 20 may be the same and their rotation speeds may be set independently of each other.

As described above, according to embodiment 8, the same effects as in embodiment 1 are provided. That is, the stator 30 is provided between the inner rotor 10 and the outer rotor 20 which are movable with the shaft 2 as an axis, and the stator 30 includes the stator core 31 formed by stacking thin sheets in the rotation direction and is retained with tensile stress applied thereto in the axial direction, whereby the stator core 31 can be retained without deteriorating the magnetic property thereof. Thus, efficiency and torque of the rotary electric machine can be enhanced.

In addition, since the inner rotor 10 and the outer rotor 20 of the rotary electric machine 1 are not connected to each other, the rotation directions and the rotation speeds of the respective rotors can be set independently of each other. Therefore, even in a case where the respective rotors drive different targets, control can be performed with their rotation directions and rotation speeds set respectively.

Embodiment 9

Hereinafter, an aircraft according to embodiment 9 will be described.

Figure 21:
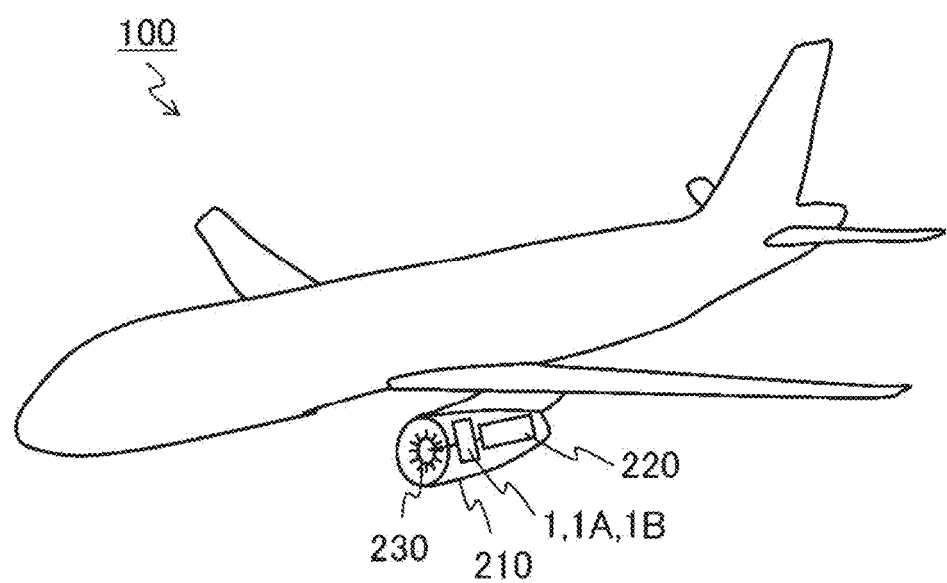
FIG. 21 is a schematic view showing an aircraft using a rotary electric machine according to embodiment 9.

FIG. 21 shows an example of an aircraft 100 according to embodiment 9, and the rotary electric machine described in each embodiment 1 to 8 is provided thereto. In FIG. 21, in an engine case 210 of the aircraft 100, a fan 230, the rotary electric machine 1, 1A, the magnetic gear 1B, and an engine 220 are arranged and connected via a shaft. The rotary electric machine 1, 1A is a motor and is used for driving the fan 230. The magnetic gear 1B is used as a transmission for increasing/reducing the speed.

In the case where the rotary electric machine 1, 1A is provided, although not shown, a gear for changing the number of revolutions may be provided between the fan 230 and the rotary electric machine 1, 1A and/or between the rotary electric machine 1, 1A and the engine 220. In this case, the gear may be a mechanical gear such as a spur gear or a planetary gear, or may be the magnetic gear 1B.

In the case where the rotary electric machine 1, 1A is provided, in FIG. 21, the rotary electric machine 1, 1A and the engine 220 are arranged coaxially with the fan 230. However, they may be arranged with different axes via a gear or the like, whereby the same effects are provided.

In the rotary electric machine shown in each embodiment 1 to 6, 8, since tensile stress is applied to the stator core, the stator core can be assuredly retained without deteriorating the magnetic property and high torque output can be obtained. Therefore, the rotary electric machine is suitably applied to a rotation target provided to the aircraft.

In the magnetic gear shown in embodiment 7, the stator core can be assuredly retained without deteriorating the magnetic property and a part subjected to wear is not present as compared to a mechanical gear. Therefore, the magnetic gear is suitably applied to a mechanism component provided to the aircraft.

Figure 22A:
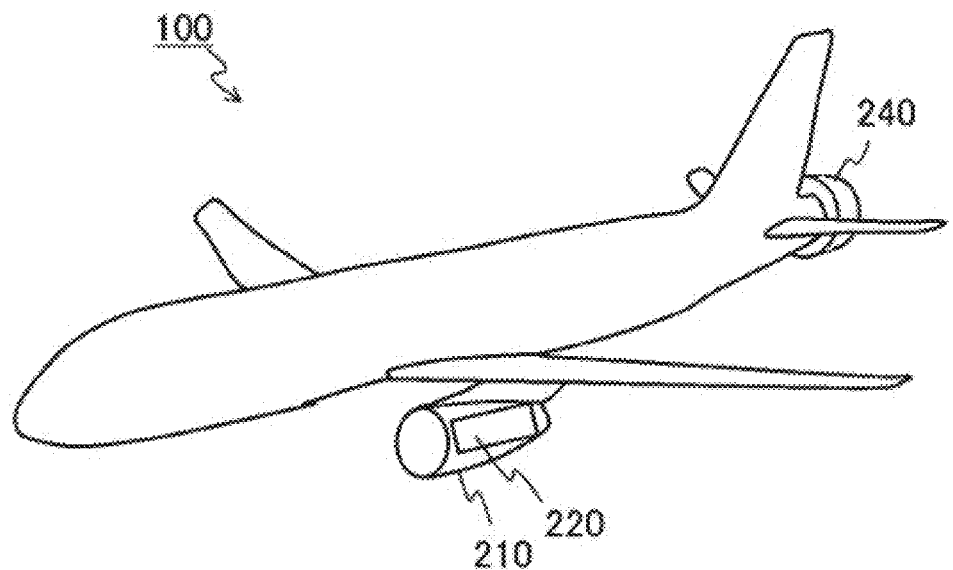
FIGS. 22A and 22B are another schematic view showing another aircraft using a rotary electric machine according to embodiment 9.
Figure 22B:
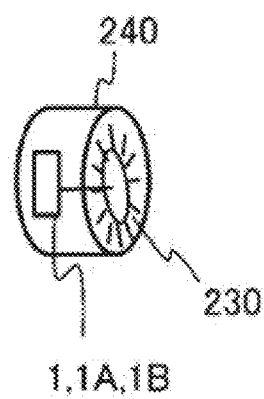

FIGS. 22A and 22B shows another example of the aircraft 100 according to embodiment 9. FIG. 22A shows the aircraft 100 having a fan case 240 at a tail, and FIG. 22B is a schematic enlarged view of the fan case 240. In the drawings, similarly, the rotary electric machine described in each embodiment 1 to 8 is provided. In FIG. 21, the rotary electric machine is stored in the same engine case 210 as the engine 220, whereas, as shown in FIGS. 22A and 22B, the rotary electric machine may be stored in a case different from the case for the engine 220, to drive a driving target. FIGS. 22A and 22B shows the example in which the rotary electric machine 1, 1A or the magnetic gear 1B is connected via a shaft to the fan 230 in the fan case 240 at the tail. In the case where the magnetic gear 1B is connected, the rotary electric machine 1, 1A or the engine 220 is further connected to perform driving.

Alternatively, without having the engine 220, the aircraft 100 may have the rotary electric machine 1, 1A, as a drive motive-power source. Although not shown, the rotary electric machine 1, 1A may be attached to a blade of a helicopter, a multicopter having a plurality of rotor blades, or the like, instead of the aircraft 100 having fixed wings, so as to be used as a drive source.

As described above, according to embodiment 9, the rotary electric machine shown in each embodiment 1 to 8 is applied to an aircraft. Thus, the stator core can be assuredly retained without deteriorating the magnetic property and high torque output can be obtained, whereby the flight range per fuel can be improved.

Modification and Supplementary Note of Embodiments

In the above embodiments, it is desirable that the stator core is retained with tensile stress applied thereto at a level not exceeding 100 MPa, but the tensile stress level may be such a level as not to cause breakdown or breakage by the stress.

In the above embodiments, the load-side stator base 34 and the non-load-side stator base 33 may be made of a magnetic material such as iron, but it is desirable that they are made of a material having small permeability or a non-magnetic material. Thus, such a magnetic flux as to pass between the stator cores 31 in the circumferential direction via the load-side stator base 34 and the non-load-side stator base 33 can be reduced or eliminated, whereby torque can be enhanced and the size and the weight can be reduced.

In the above embodiments, the rotary electric machines 1, 1A are described as a motor. However, the same effects are provided even when the rotary electric machines 1, 1A operate as an electric generator.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

1, 1A rotary electric machine
1B magnetic gear
2, 2A shaft
3, 3A load-side inner bearing
4, 4A non-load-side inner bearing
5 load-side outer bearing
6 non-load-side outer bearing
10 inner rotor
10A non-load-side rotor
12 boss
12A non-load-side boss
14, 14A permanent magnet
20 outer rotor
20A load-side rotor
21 outer shaft
21A load-side boss
22, 22A permanent magnet
30, 30A stator
31, 31A stator core
32, 32A stator coil
33 non-load-side stator base
33A radially-inner-side retention member
33Ab groove
34 load-side stator base
35 load-side base retention member
35A radially-outer-side retention member
35Aa groove
36 stator core load-side retention portion
36a, 37a hole
36A stator core radially-outer-side retention portion
37 stator core non-load-side retention portion
37A stator core radially-inner-side retention portion
38 load-side retention surface
38A radially-outer-side retention surface
39 non-load-side retention surface
39A radially-inner-side retention surface
40 fixation pin
41A non-load-side base
41B load-side base
100 aircraft
210 engine case
220 engine
230 fan
240 fan case
311 side portion
311A protruding part
311B recessed part
311a stacked body
311b structural body
312 side-portion retention portion
312a, 312a1, 312a2 cutout
312b flange

The invention claimed is:

1. A rotary electric machine comprising:
a stator core; and
two movable parts which are placed with the stator core interposed therebetween and rotate about an identical rotary shaft, wherein
at least part of the stator core is formed by stacking thin sheets in a rotation direction of the two movable parts,
the stator core has, at both ends, stator core retention portions extended in a direction parallel to surfaces thereof opposed to the two movable parts and perpendicular to the rotation direction of the movable parts,
retention surfaces of the stator core retention portions at both ends are respectively fixed in contact with retention members,
the retention surfaces of the stator core retention portions at both ends are formed to face toward each other, and
the stator core is fixed with tensile stress applied thereto.

2. The rotary electric machine according to claim 1, wherein the stator core retention portions are formed such that, at each of both ends of the stator core, both side portions thereof on the two movable part sides are extended.

3. The rotary electric machine according to claim 2, wherein distal end portions of the stator core retention portions have L shapes bent from extended directions thereof, and are inserted in grooves provided in the retention members.

4. The rotary electric machine according to claim 3, wherein the distal end portions of the stator core retention portions have L shapes bent at obtuse angles from the extended directions, and are inserted in the grooves provided in the retention members.

5. The rotary electric machine according to claim 3, wherein the L shapes of the distal end portions of the stator core retention portions are bent towards each other at the one end of the both ends and are bent away from each other at the another end of the both ends.

6. The rotary electric machine according to claim 1, wherein the stator core has
two side portions respectively opposed to the two movable parts, and
a side-portion retention portion retaining the two side portions between the two movable parts,
the side portions are each formed by stacking thin sheets in the movable direction of the two movable parts,
the side-portion retention portion is formed by stacking, in the rotary shaft direction, thin sheets having cutouts on sides respectively opposed to the two movable parts, the two side portions being retained by the cutouts of the side-portion retention portion, and the stator core includes, at both ends of each of the two side portions, the stator core retention portions extended in the rotary shaft direction from the side-portion retention portion.

7. The rotary electric machine according to claim 1, wherein the stator core retention portions are extended from centers at both ends of the stator core while having smaller widths than a width of the stator core opposed to the two movable parts.

8. The rotary electric machine according to claim 7, wherein a distal end portion of the stator core retention portion on at least one end side has a T shape having a part orthogonal to an extended direction thereof, and is inserted in a groove provided in the retention member.

9. The rotary electric machine according to claim 8, wherein a connection portion of the part orthogonal to the extended direction in the T shape is formed in a tapered shape.

10. The rotary electric machine according to claim 7, wherein a distal end portion of the stator core retention portion on at least one end side has a hole which is engaged with a fixation pin attached to the retention member.

11. The rotary electric machine according to claim 1, wherein a coil is wound around the stator core.

12. The rotary electric machine according to claim 1, wherein
one of the movable parts is a first rotor, and the first rotor includes a boss portion press-fitted and fixed to the rotary shaft, and a first magnet adhered and fixed to a radially outer side of the boss portion,
another of the movable parts is a second rotor, and the second rotor includes an outer shaft fixed to the rotary shaft, and a second magnet adhered and fixed to a radially inner side of the outer shaft,
the stator core is provided between the first magnet and the second magnet,
the stator core retention portion on one end side is fixed by being attached to a non-load-side stator base rotatably retaining the first rotor and the second rotor, and
the stator core retention portion on another end side is fixed by being attached to a load-side stator base rotatably retaining the first rotor and the second rotor.

13. The rotary electric machine according to claim 1, wherein
one of the movable parts is a first rotor, and the first rotor includes a non-load-side boss portion press-fitted and fixed to the rotary shaft, and a first magnet adhered and fixed to an axial-direction load side of the non-load-side boss portion,
another of the movable parts is a second rotor, and the second rotor includes a load-side boss portion fixed to the rotary shaft, and a second magnet adhered and fixed to an axial-direction non-load side of the load-side boss portion,
the stator core is provided between the first magnet and the second magnet,
the stator core retention portion on one end side is fixed by being attached to a radially-inner-side retention member rotatably retaining the first rotor and the second rotor, and
the stator core retention portion on another end side is fixed by being attached to a radially-outer-side retention member surrounding the first rotor and the second rotor.

14. The rotary electric machine according to claim 1, wherein at least part of the stator core is made of iron.

15. An aircraft comprising:
a rotary electric machine including:
a stator core; and
two movable parts which are placed with the stator core interposed therebetween and rotate about an identical rotary shaft, wherein
at least part of the stator core is formed by stacking thin sheets in a rotation direction of the two movable parts,
the stator core has, at both ends, stator core retention portions extended in a direction parallel to surfaces thereof opposed to the two movable parts and perpendicular to the rotation direction of the movable parts,
retention surfaces of the stator core retention portions at both ends are respectively fixed in contact with retention members,
the retention surfaces of the stator core retention portions at both ends are formed to face toward each other, and
stator core is fixed with tensile stress applied thereto.

16. The aircraft according to claim 15, wherein the rotary electric machine is configured to propel the aircraft.

17. The aircraft according to claim 15, further comprising a fan configured to be driven by the rotary electric machine.

18. The aircraft according to claim 17, further comprising a gear to adjust a number of revolutions between the rotary electric machine and the fan.

* * * * *